United States Patent
Yuan et al.

(10) Patent No.: US 7,996,113 B2
(45) Date of Patent: Aug. 9, 2011

(54) METHODS OF INTEGRATING REAL AND VIRTUAL WORLD USING VIRTUAL SENSOR/ACTUATOR

(75) Inventors: Chengyin Yuan, Rochester Hills, MI (US); Fangming Gu, Rochester Hills, MI (US); Stephan R. Biller, Birmingham, MI (US); Leandro G. Barajas, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 349 days.

(21) Appl. No.: 12/237,944

(22) Filed: Sep. 25, 2008

(65) Prior Publication Data

US 2009/0088885 A1    Apr. 2, 2009

Related U.S. Application Data

(60) Provisional application No. 60/976,101, filed on Sep. 28, 2007.

(51) Int. Cl.
G05B 15/00    (2006.01)
(52) U.S. Cl. .......... 700/258; 700/97; 700/108; 700/213; 715/771
(58) Field of Classification Search .................. 700/108, 700/110, 245, 248, 258, 97, 213; 715/771
See application file for complete search history.

(56) References Cited

U.S. PATENT DOCUMENTS
2007/0265721 A1* 11/2007 Coburn et al. ................... 700/97

OTHER PUBLICATIONS

Per Cederberg, Virtual Triangulation Sensor Development, Behavior Simulation and CAR Integration Applied to Robotic Arc-Welding, Dec. 2002, Journal of Intelligent Robotic Systems, vol. 35, Issue 4.*

* cited by examiner

*Primary Examiner* — Paul L Rodriguez
*Assistant Examiner* — Nate Laughlin
(74) *Attorney, Agent, or Firm* — John A. Miller; Miller IP Group, PLC

(57) ABSTRACT

An integrated real and virtual manufacturing automation system that employs a programmable logic controller that controls part flow between a real machine in the real world part of the system and a virtual machine in the virtual world part of the system using virtually coupled sensors and actuators. A real world sensor senses the position of the real world machine and a real world actuator actuates the real world machine. Likewise, a virtual world sensor senses the position of the virtual world machine and a virtual world actuator actuates the virtual world machine. An interface device transfers signals between the virtual world part of the system and the real world part of the system, and an input/output device processes signals sent to the programmable logic controller and signals sent from the programmable logic controller.

20 Claims, 17 Drawing Sheets

US 7,996,113 B2

METHODS OF INTEGRATING REAL AND VIRTUAL WORLD USING VIRTUAL SENSOR/ACTUATOR

CROSS-REFERENCE TO RELATED APPLICATIONS

This application claims the benefit of the filing date of Provisional Application No. 60/976101, titled Methods of Integrating Real and Virtual World Using Coupled Sensor/Actuator, filed Sept. 28, 2007.

BACKGROUND OF THE INVENTION

1. Field of the Invention

This invention relates generally to an integrated real and virtual manufacturing automation system that employs a programmable logic controller that controls part flow between a real machine in a real world part of the system and a virtual machine in a virtual world part of the system and, more particularly, to an integrated real and virtual manufacturing automation system that employs a programmable logic controller that controls part flow between a real machine in a real world part of the system and a virtual machine in a virtual world part of the system using virtually coupled sensors and actuators.

2. Discussion of the Related Art

Various approaches are known in the art for testing and debugging manufacturing automation systems and processes. One approach is referred to as a traditional field test where testing of new physical equipment using existing systems can be achieved by either setting up a duplicate testing purpose only system or using the existing system in the plant. While there is excessive cost associated with creating and maintaining a duplicate testing purpose only system, testing using the plant requires interrupting current production. Also, the field testing is not feasible when the new physical equipment is unobtainable.

Another approach is referred to virtual commissioning that includes testing with emulated systems and components. By using the emulated or simulated system and components, virtual commissioning enables reasonable accuracy and greater efficiency of validation allowing for many test scenarios that would not be possible at the installation site without adding significant deployment time and cost. Specifically, for virtual commissioning of manufacturing automation controls, the control logic is tested on a virtual model of the system or a station before actually being built, thus greatly reducing the time required for field testing. However, virtual commissioning hinges on the completeness and accuracy of the virtual model of the system and components. In particular, the modeling fidelity of each automation component, such as the PLC, I/O block, sensors/actuators, network, wiring and HMI, has a direct impact on the validity of the virtual commissioning results. Furthermore, creating a 100% complete and accurate virtual environment is not likely to be realized in the near future.

The third potential approach is referred to as a hybrid emulation environment. The hybrid emulation environment is comprised of virtual emulated models and real physical system components whose virtual model is not readily available. During the manufacturing process, the manufacturing automation system moves the part from one manufacturing station to another manufacturing station while performing certain manufacturing activities, such as welding, to the part. When a part is moved from a station in the virtual world to another station in the physical world, the part has to be presented to the physical station so that the physical station may function properly. In the contrast, when a part is moved from a physical work-station to a virtual work-station, the physical part has to be properly handled in the real world and its transfer presence to the virtual world has to be effectively communicated to the virtual world.

As discussed above, it is known in the art to simulate manufacturing or other processes prior to implementing the process so that engineers and technicians can ensure that the process will operate adequately and efficiently as intended. One technique for simulating such a process includes emulating the process in the virtual world using algorithms on a computer system.

It is sometimes not possible to provide a realistic virtual model of a particular robot or other machine that the engineer wants to test. There are many reasons as to why a particular machine cannot be accurately modeled, including trade secret information of the particular machine from the manufacturer. In these situations, it is desirable to provide a hybrid environment of the manufacturing cell, where certain portions of the cell are provided in the virtual world and those machines that cannot be virtually modeled are provided as real devices in the process.

Current virtual emulation approaches require extensive model development that requires costly engineering time and software investment. Emulation is increasingly used for virtual testing of complex automation systems, but it cannot guarantee the complete correctness of a given automation system because of the inaccuracies in a particular model. The development of simulation models requires additional time and engineering expertise. Highly accurate model development is time consuming, expensive and sometimes not possible. Field testing and debugging requires the availability of new equipment and access to deployed automation systems that may result in costly regular production shutdown.

SUMMARY OF THE INVENTION

In accordance with the teachings of the present invention, an integrated real and virtual manufacturing automation system is disclosed that employs a programmable logic controller that controls part flow between a real machine in the real world part of the system and a virtual machine in the virtual world part of the system using virtually coupled sensors and actuators. A real world sensor senses the position of the real world machine and a real world actuator actuates the real world machine. Likewise, a virtual world sensor senses the position of the virtual world machine and a virtual world actuator actuates the virtual world machine. An interface device transfers signals between the virtual world part of the system and the real world part of the system, and an input/output device processes signals sent to the programmable logic controller and signals sent from the programmable logic controller. The system can include a voltage translation device for converting voltage signals transmitted between the input/output device and the interface device so as to provide a direct electrical connection between the real part of the system and the virtual part of the system.

The system may include a first complimentary pair of a physical sensor and an actuator and a second complimentary pair of a physical sensor and an actuator in the real world part of the system. The sensor in the first complimentary senses signals from the actuator in the first complimentary pair that is driven by the input-output device to by-pass the primary virtual world sensor through the interface device. The actuator in the second complimentary pair receives signals that are supposed to be sent to the primary virtual world actuator through the interface device from the input/output device and cause the sensor in the second complimentary pair to generate signals.

Additional features of the present invention will become apparent from the following description and appended claims taken in conjunction with the accompanying drawings.

DETAILED DESCRIPTION OF THE EMBODIMENTS

Figure 1:
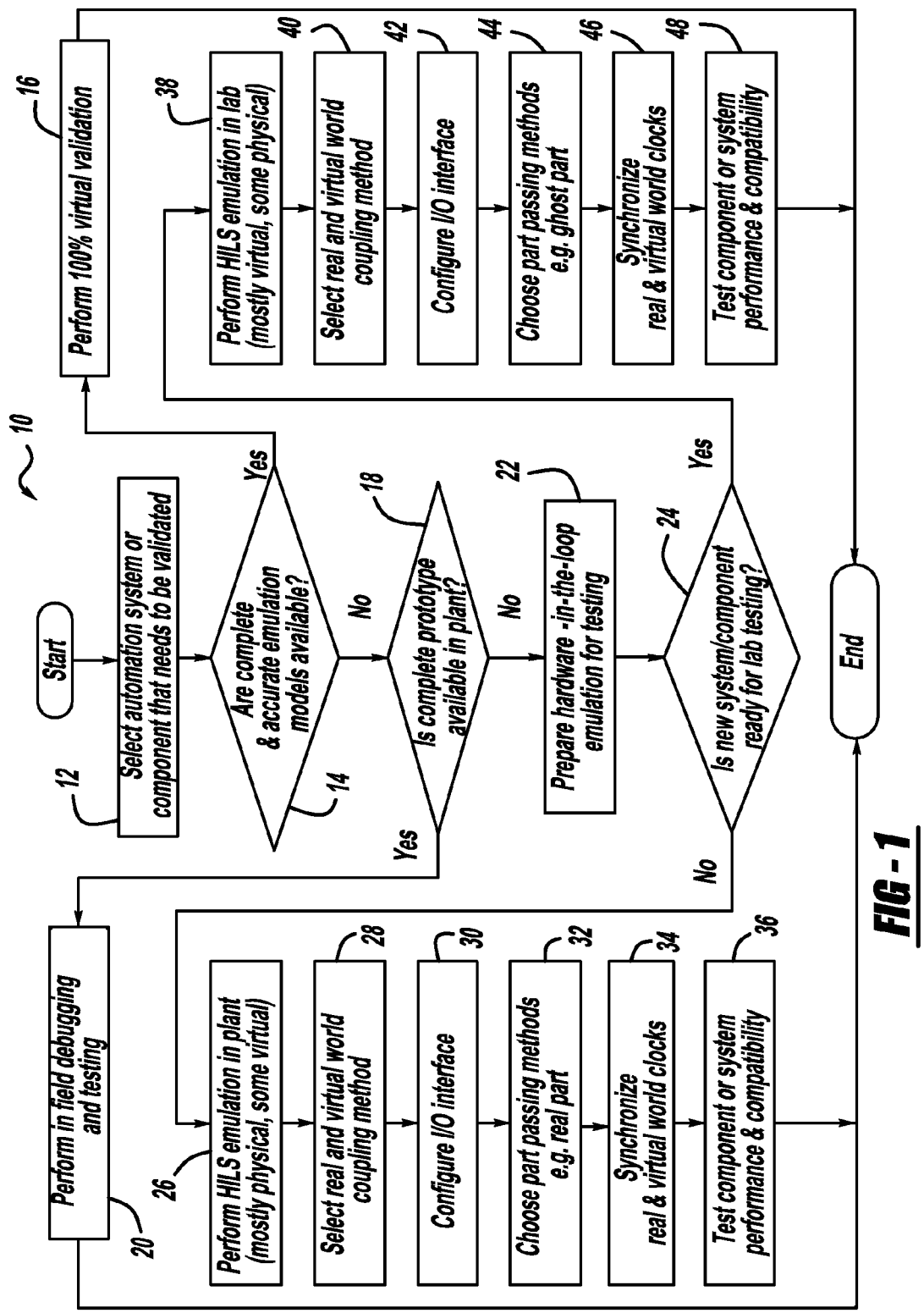
FIG. 1 is a flow chart diagram showing a process for determining whether a hybrid virtual and real emulation process needs to be developed that is a combination of one or more real machines in a virtual process based on available information.

The following discussion of the embodiments of the invention directed to an integrated real and virtual manufacturing automation system that employs a programmable logic controller that controls part flow between a real machine in a real world part of the system and a virtual machine in a virtual world part of the system using virtually coupled sensors and actuators is merely exemplary in nature and is in no way intended to limit the invention or its application or uses. For example, the present invention has particular application for manufacturing processes in an automotive manufacturing plant. However, as will be appreciated by those skilled in the art, the system and method of the invention may have application for other production facilities.

As will be discussed in detail below, the present invention integrates physical and emulated automation components with data and information exchange between the virtual world and the real world. The invention provides an effective platform for developing and testing hardware components that are difficult or time consuming to simulate with existing resources and technology. The present invention also provides a design for automation systems and component compatibility and performance testing. With this approach, new system validation times can be reduced, and the launch quality of the new system can be improved. The present invention provides a hybrid environment that integrates physical and emulated automation components including data and information exchange between the virtual world and the real world. The technique can be used for automation system and component compatibility and performance testing. A generic process can be developed to decide whether it is effective to use hardware-in-the-loop (HIL) emulation for automation component compatibility and performance testing, and corresponding validation procedures are defined.

The HIL emulation for automation component compatibility and performance testing provides a number of advantages including control validation for testing control logic on hybrid or simulated processes, hypothetical machine arrangements providing plug and play characteristics that make it possible to test various arrangements easily and the testing of new hardware where the new hardware can be plugged into an existing process simulation and run in real time to test its compatibility and performance and simulations can be plugged into an existing system and run in real time to test feasibility. The HIL emulation benefits include shorter system development cycles because the hard-to-model virtual component can be replaced by a real component, earlier testing system and feedback using virtual components along with real system set-up environment, lower cost for various scenario testing as the virtual models can be reused and duplicated seamlessly, and higher confidence on new system performance with usage of real network and standard interfaces. The real and virtual integration provides any level of virtual and real combination, seamless part handling and data exchange, plug and play modular characteristics, controller and components are unaware of the presence of other regions, real-time event-driven data handling, scalable and hierarchical and standardized signal coupling and interface.

FIG. 1 is a flow chart diagram 10 showing a general overview of a process of the invention for determining whether an emulated process of a manufacturing process will include real machines, according to an embodiment of the present invention. The flow chart diagram shows two different scenarios for an integrated real and virtual manufacturing automation system and steps for setting up such a hybrid system. Both set-up scenarios enable an engineer to evaluate system performance or machine compatibility when new equipment is added to or is used to replace existing equipment in an existing manufacturing automation system. The system performs a machine compatibility test with the integrated real and virtual manufacturing automation system, which can be done either in the plant or the lab. However, when the test is done in the field, the physical machines will be in the majority of the integrated real and virtual manufacturing automation system. This method allows an engineer to test the new system machines with real production manufacturing automation system without concern of fidelity of the virtual models and incurring cost for transporting the real new system machines to the testing facility, or even higher cost for setting up a duplicate system in a prototype shop.

While in a lab setting and when the virtual model of new system machines is not available, system performance and machine compatibility testing can be carried out by integrating the new physical system machines with a perspective emulated manufacturing automation system that is a virtual model of an existing system and has been calibrated against the corresponding physical system. Furthermore, this method allows an engineer to conduct the system performance and machine compatibility using the earlier stage prototype of the new system machines before finalizing the system design.

The process first selects a particular automation system or component that needs to be validated or emulated at box 12. The process then determines whether complete and accurate emulation models are available for the particular system or component that is to be emulated at decision diamond 14. If all of the models that are necessary for the emulation are available at the decision diamond 14, then the process performs a 100% virtual emulation and validation of the system or component at box 16. If all of the models are not available at the decision diamond 14, then the process determines whether a complete prototype of those systems or components that cannot be emulated are available at the plant location at decision diamond 18. If the complete system or component is available at the plant at the decision diamond 18, then the process will perform in field debugging and testing processes at the plant at box 20. If a prototype of the system or component is not available at the plant at the decision diamond 18, then the process prepares an HIL for testing at box 22, and then determines if the new system or component is ready for lab testing at decision diamond 24.

If the new system or component is not ready for lab testing at the decision diamond 24, then the emulated system or component may be integrated with an existing physical system and process, starting at box 26, which results in HIL emulation in the plant. Therefore, the actual physical machine can be provided at its normal location for automation system compatibility and performance testing. In this situation, most of the system exists in the physical world, with some virtual components. The process then selects a real and virtual world coupling method at the plant location at box 28 to couple the physical system with a virtual component, such as an emulated robot on a computer. The process then configures an input/output (I/O) interface at box 30 which is a bridge between the real and virtual world, and chooses a part passing method at box 32 that determines how a real part location sensing to be coupled between a virtual machine and a real machine in the system. The process then synchronizes the real machine and the virtual world clocks at box 34, and tests the component or system for performance and compatibility at box 36.

If the new system or component is ready for lab testing at the decision diamond 24, then the process performs the HIL emulation in the lab where the emulation is mostly in the virtual world with a few physical machines. As above, the process selects the real and virtual world coupling method at box 40, configures the input/output interface at box 42, determines how the part location information will be passed between the virtual world and the real world at box 44, synchronizes the real world clocks and the virtual world clocks at box 46 and tests the component or system for performance and compatibility at box 48.

Figure 2:
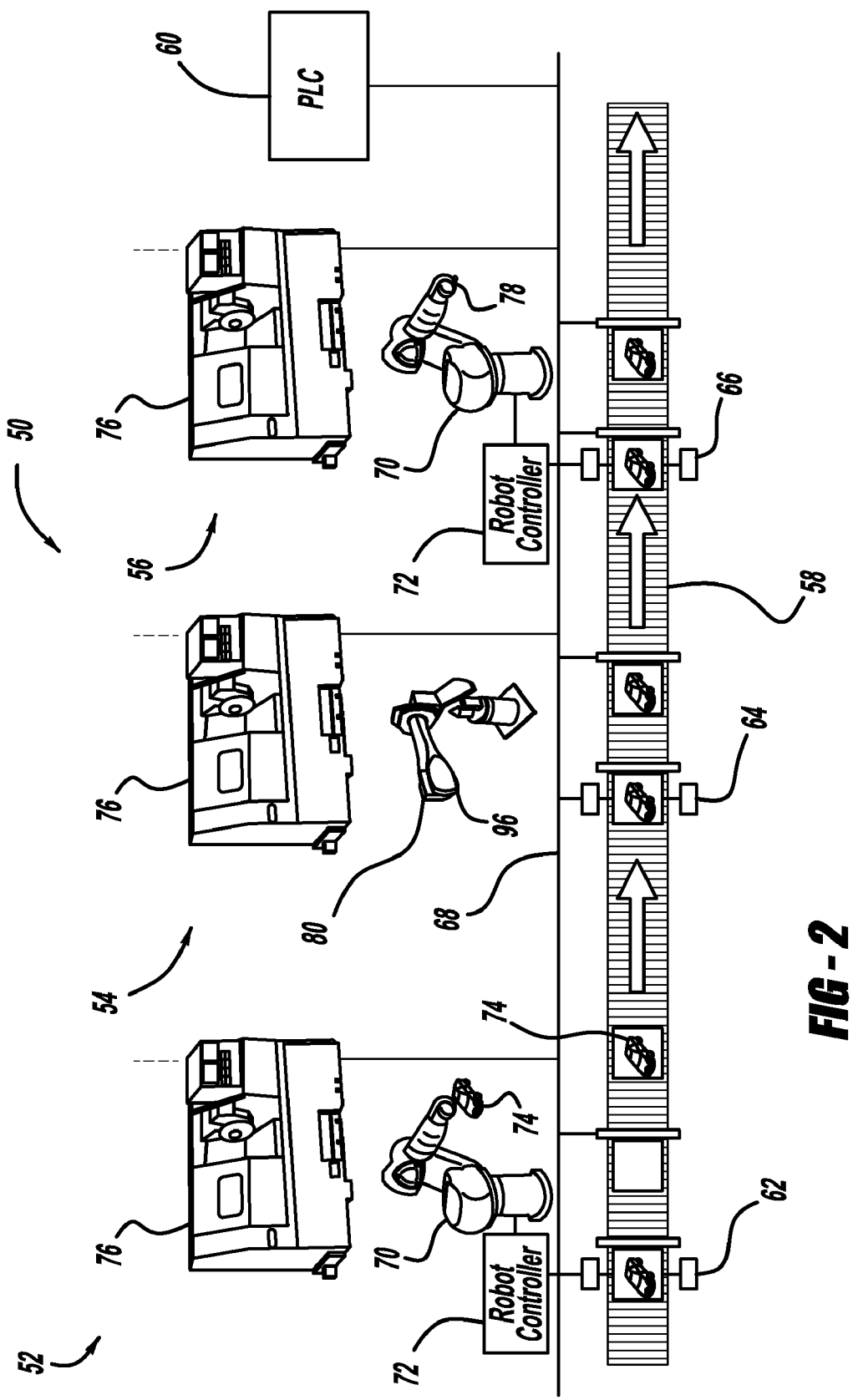
FIG. 2 is a plan view showing integration of an emulated and real manufacturing automation system.

FIG. 2 is a plan view of an exemplary automated manufacturing system 50 including two real manufacturing cells 52 and 56 and a virtual manufacturing cell 54 linked together by a conveyer 58, where the conveyer 58 delivers a part 74 from cell to cell. The system 50 is controlled by a programmable logic controller (PLC) 60 based on the status of various sensors, for example sensors 62, 64 and 66, through a network 68 provided throughout the system 50, where other system status information is also provided on the network 68.

A real robot 70 is controlled by a robot controller 72 in the real manufacturing cells 52 and 56 and carries the part 74 from the conveyer 58 to a machine 76 that will perform an operation on the part 74 and return it back to the conveyer 58. An end-effector 78 on the robot 70 may be directly controlled by the robot controller 72 or indirectly controlled by the PLC 60 depending on the system architecture. In the latter case, information, such as end-effector is in position, may have to be sent to the PLC 60 so that the PLC 60 can issue the necessary automation command to activate the end-effector 78 to pick up the part 74. Similarly, when the end-effector 78 moves into a position to drop off the part 74 at one of the machines 76, the opening of the end-effector 78 will be directly controlled by the robot controller 72 or the PLC 60 based on system architecture. When the machine 76 finishes its operation on the part 74, the robot 70 will pick up the part 74 from the corresponding machine 76 and drop off the part 74 at the original location on the conveyer 58. After the part 74 has been placed back on the conveyer 58, the conveyer 58 will move the part 74 a step forward to the next cell 54 so that the new operation cycle can start.

The virtual cell 54 in the system 50 includes an emulated or virtual robot 80 including a virtual end-effector sensor 96 instead of a real robot. To integrate the emulated or virtual robot 80 with the real physical system, the corresponding sensor information that triggers the real robot operation is transmitted to the robot controller 72 and then the program that carries out the robot simulation and the status change information of the virtual robot 80 when it drops off the part 74 at the designated location is transmitted to the PLC 60 so that the machine 76 at that cell will function properly.

Figures 3, 4:
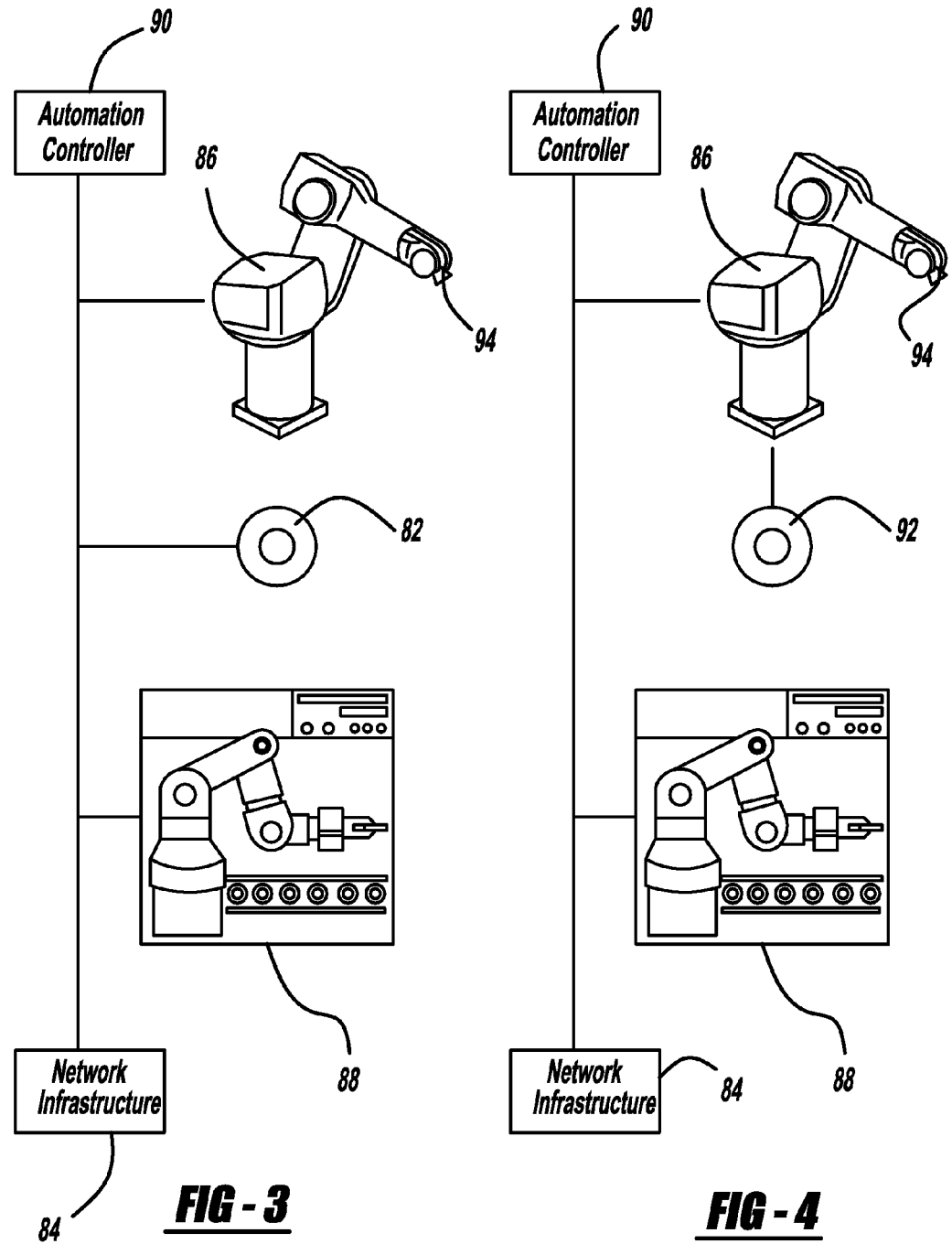
FIG. 3 is an illustration of a sensor being directly attached to a controller in a manufacturing process by a network infrastructure.
FIG. 4 is an illustration of a sensor being attached to a machine, either emulated or physical, in a manufacturing process.

FIGS. 3 and 4 provide two sensor connecting methods for the virtual end-effector sensor 96 between the virtual robot 80 and the real machine 76 in the cell 54 and the rest of the system. In FIG. 3, a sensor 82 is directly attached to an automation controller, such as a PLC 90, through a control network 84. In FIG. 4, a sensor 92 is attached to a local machine 88, such as a robot. With the system configuration of FIG. 4, the PLC 90 only controls the start of the robot 86 and only when the complete task of the robot 86 is finished, the PLC 90 will be informed that the next task is ready to be performed. The sensing signal from the sensor 92 and a state change of actuator, such as an end-effector 94, are not necessarily transmitted to the PLC 90.

Figure 5:
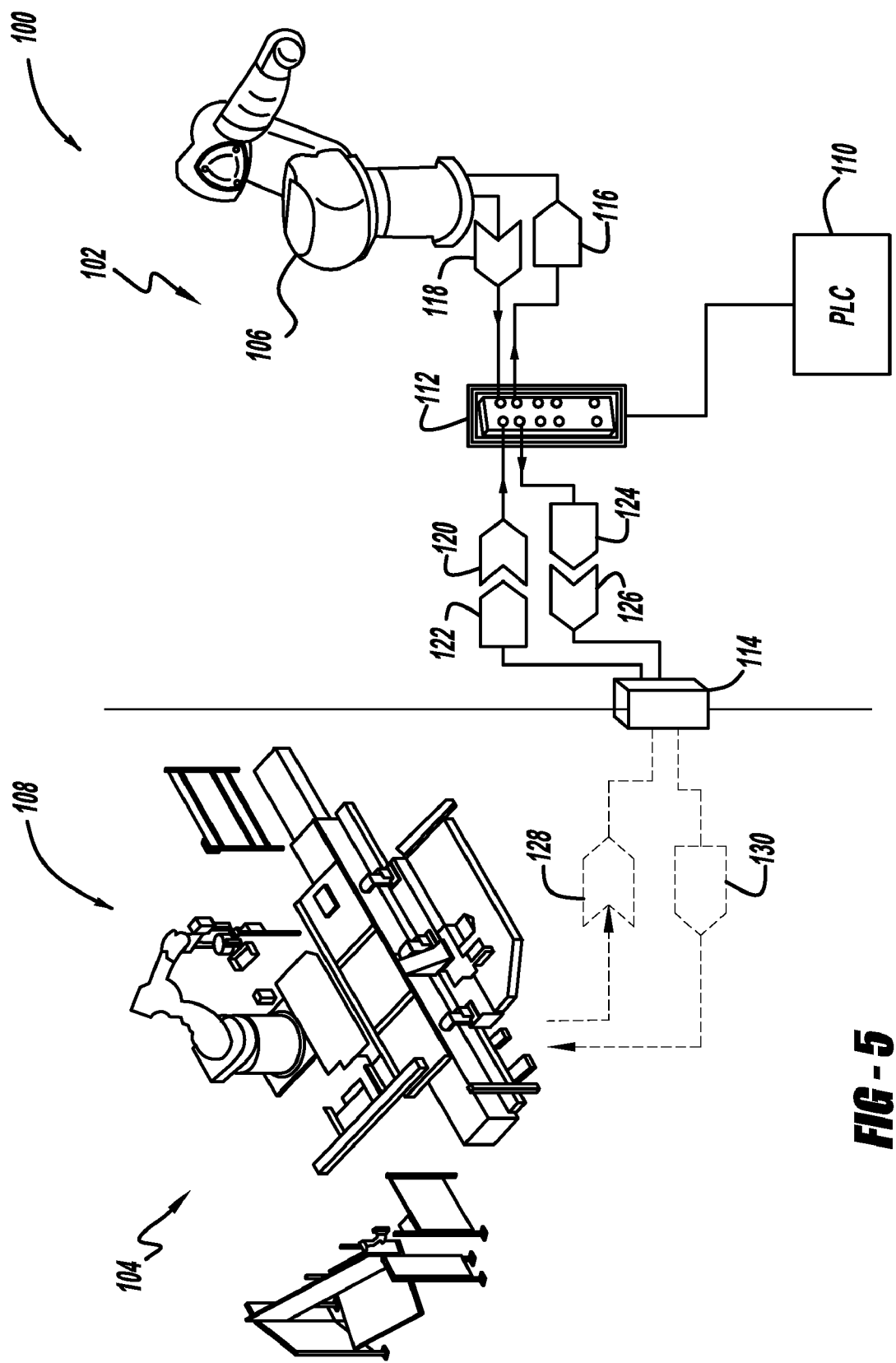
FIG. 5 is a plan view of an integrated real and virtual manufacturing automation system including complimentary pairs of physical sensors and actuators.

FIG. 5 is an illustration of an integrated real and virtual manufacturing automation system 100 including complimentary pairs of physical sensors and actuators. The system 100 includes a real world domain 102 including a real machine 106, such as a robot, and a virtual world domain 104 including a virtual world machine 108, where the robot 106 is a component of a manufacturing automation system. In this embodiment, the real domain 102 and the virtual domain 104 are electronically isolated. Signals passed between the real world domain 102 and the virtual world domain 104 is facilitated by matching an actuator with a complimentary sensor and a sensor with a complimentary actuator, as will be discussed in more detail below.

The robot 106 and the virtual machine 108 are controlled by a PLC 110 through an industrial network device and a corresponding input/output (I/O) module 112. An I/O interface card 114 transfers signals between the real world domain 102 and the virtual world domain 104. The real world domain 102 includes a real sensor 118 and a real actuator 116, where the real sensor 118 provides a signal of the position of the robot 106 and the real actuator 116 actuates the robot 106 to move it from position to position. The real world domain 102 also includes a complimentary pair of a sensor 120 and an actuator 122 and a complimentary pair of an actuator 124 and a sensor 126, where the sensors detect actuation of the actuator in the pair. The virtual world domain 104 includes a virtual sensor 128 that senses the position of the machine 108 and a virtual actuator 130 that virtually actuates the machine 108. Signals are said to be mapped between a pair of coupled sensors when the sensor signal from either a virtual sensor or a real sensor is used to override or by-pass the signal from a real sensor or a virtual sensor, respectively.

As discussed herein, complimentary sensors and actuators can be set forth as follows. For a photo-eye sensor, a complimentary actuator could be a blade mounted on a shaft of a stepper motor. By moving the blade into and out of the photo-eye path, a part passing through the path can be simulated. For a proximity sensor, the presence of a part can be simulated by moving a metallic object into and out of the sensing area of the sensor. For an actuator, such as a lift or a pusher, a complimentary sensor could be a pair of switches at two extreme positions of the actuator.

There are two types of sensor and actuator coupling, namely, parallel coupling and serial coupling, sometimes referred to as direct coupling and sequence coupling, respectively. A virtual sensor coupled to a synchronized real sensor or vice versa is said to be coupled in parallel. Similarly, a virtual actuator coupled to a synchronized real actuator or vice versa is also said to be coupled in parallel. A sensor triggered by an immediate upstream actuator through a virtual or real process is said to be coupled in serial. If a sensor is coupled to an actuator using a virtual process, the coupling is referred to as virtual coupling. If a sensor is coupled to an actuator using a real process, the coupling is referred to as physical coupling.

Sensor signals from the real sensor 118 of the position of the robot 108 are directly connected to the I/O module 112 and signals from the virtual sensor 128 become the output signals of the interface card 114 and trigger the actuation of the real actuator 122, whose state of change will be sensed by the real sensor 120. The output signal of the real sensor 120 is connected to the I/O module 112. In this way, the virtual sensor 128 is coupled to the real sensor 120 in parallel while the real actuator 122 and the real sensor 120 are coupled in serial. Similarly, an output signal from the I/O module 112 to the robot 106 is connected directly. For the virtual world domain 104, the output signal of the I/O module 112 is connected to the real actuator 124, whose state change will be sensed by the complimentary sensor 126. The output of the sensor 126 is the input to the interface card 114 and will drive the virtual actuator 130 to alter its state. In this way, the real actuator 124 is coupled to the virtual actuator 130 in parallel, while the real actuator 124 is coupled to the real sensor in serial.

In the event that the real sensor 118 is not directly connected to the PLC 110, the complimentary actuator 126 is needed to capture the signal to relay it to the virtual domain 104 through the interface card 114. Similarly, the actuator 116 will have to be connected to a complimentary sensor, and then the state change of the actuator 116 will be captured and sent to the virtual world 104 through the interface card 114.

Figure 6:
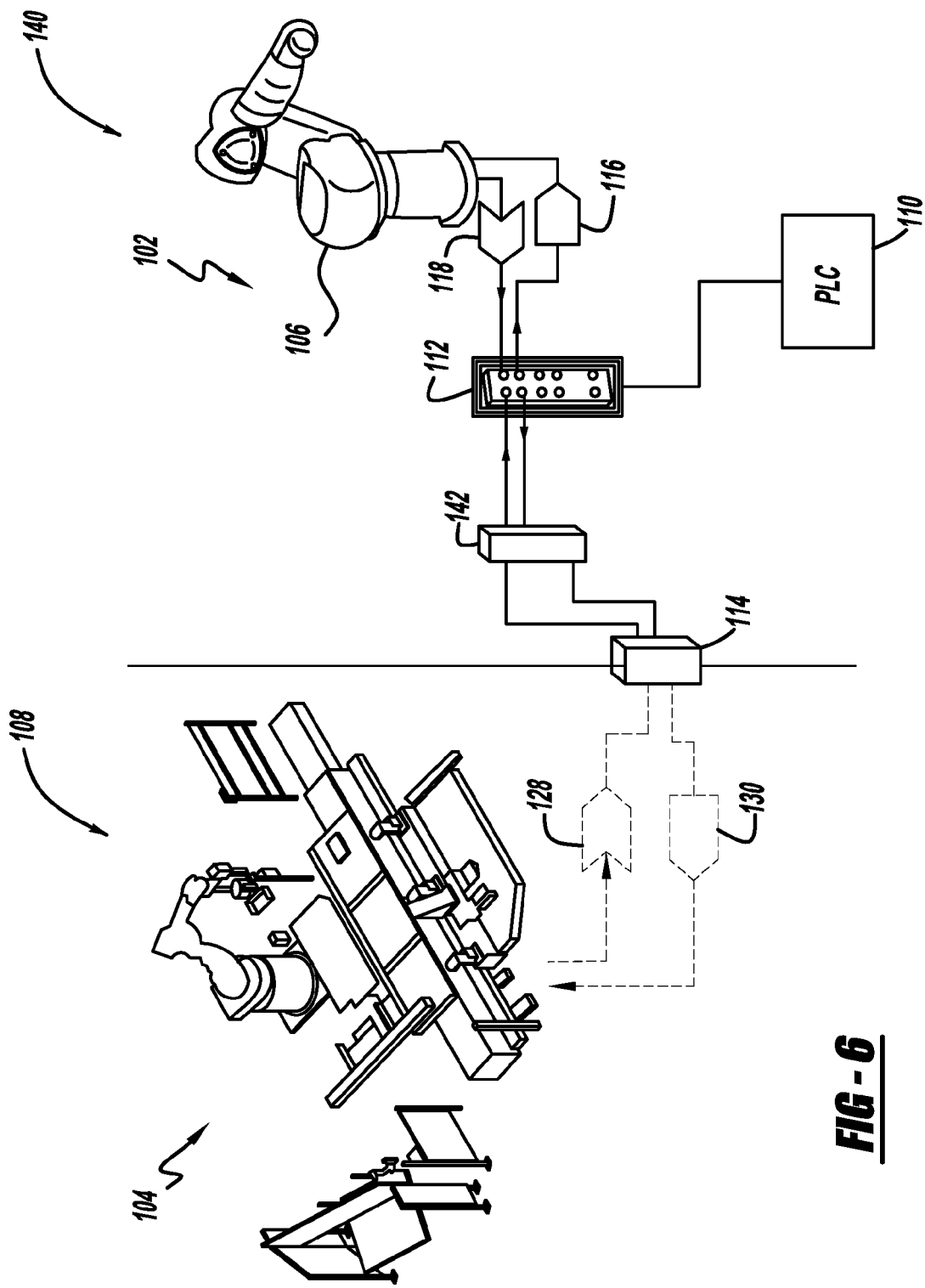
FIG. 6 is a plan view of an integrated real and virtual manufacturing automation system showing a direct electrical connection between a virtual domain and a real domain.

FIG. 6 is a plan view of an integrated real and virtual manufacturing automation system 140 providing a direct electrical connection between the real domain 102 and the virtual domain 104, where like elements to the system 100 are identified by the same reference numeral. In the system 140, the complimentary pairs of sensors and actuators between the I/O module 112 and the I/O interface card 114 are replaced with a voltage-translation device 142 so that the real and virtual portions of the system 140 are linked directly together. The I/O interface card 114 will facilitate the signal passing between the real and virtual domains of the system 140 and the voltage-translation device 142 will match the difference in the analog signal levels between the virtual cell 104 and the real world machines. Sensor signals from the robot 106 are directly coupled to the I/O module 112, while signals from the virtual sensor 128 become the output signals of the interface card 114, and using the voltage-translation device 142, connects directly to the input of the I/O module 112. Similarly, the output signal from the I/O module 112 to the robot 106 through the actuator 116 are connected directly. For the virtual domain 104 of the system 140, the output signal of the I/O module 112 is connected directly to the interface card 114 through the voltage-translation device 142, which converts the output of the I/O module 112 to a voltage acceptable for the interface card 114.

Figure 7:
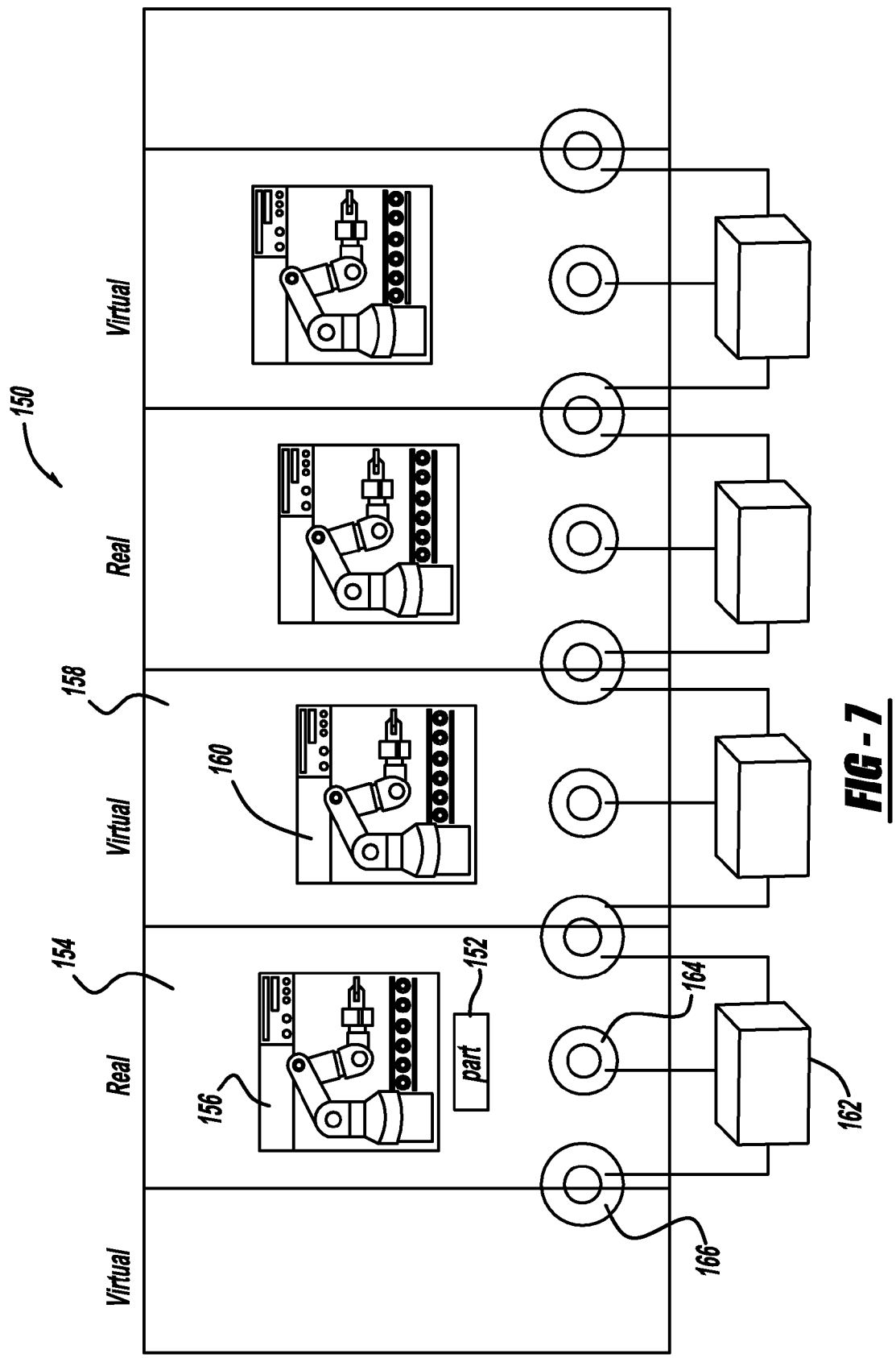
FIG. 7 is a flow diagram showing a transition between the real domain and the virtual domain in a manufacturing process, where sensors are provided between the real and virtual domains.

FIG. 7 is a plan view of a manufacturing process 150 for a part 152 moving through and between real world cells 154 including real world machines 156, such as a real robot, and virtual world cells 158 including virtual machines, such as a virtual robot 160, that is a model of an actual robot. When the part is in the real world cell 154, the real robot 156 can work on the part 152 as a normal process. A part presence token 164 will be on to indicate that the real part 152 is available in the process. When the part 152 moves into the virtual world cell 158, the part presence token 164 will be off to indicate that there is no physical part in the process anymore, and the virtual robot 160 will work on a virtual part. When a real robot receives a virtual part from the preceding machine 160, it needs to think that the part 152 is actually there. Therefore, the virtual part is provided in the real cells 154 that provides a signal to a coupled real sensor telling the machine 156 that the part 152 is actually in its proper orientation, even though it may not be and the part presence token 164 is off.

In other situations, the actual part 152 may be worked on by the machine 156 in the real cell 154, where the virtual part 162 is inactive. Sensors 166 are provided between the real cells 154 and the virtual cells 158 so that the process knows when the part 152 is moved from a real cell 154 to a virtual cell 158 and from a virtual cell 158 to a real cell 154.

Because the part 152 cannot be physically transported across the boundary of the virtual and real domains, the part 152 moving from the real world to virtual world and returning to the real world from the virtual world for the given example set-up can only be emulated by the following. When a part is moving from the real world to the virtual world, the actual part remains at the current location and a virtual part is created in the virtual world when the sensor information is received that the part is moved into the virtual world. For the opposite direction, when the part is moving from the virtual world to the real world, the virtual part in the virtual world is destroyed and at the same time signals are provided that the part is at its designated location in the real world. Obviously, this scenario only works under the condition that the part remains at the same location before moving to the virtual world from the real world and after returning to the real world from the virtual world. Therefore, in the case of the middle cell (cell 54 in FIG. 2), the real machine (machine 76 in FIG. 2) will not see the real part that remains on the conveyer (conveyor 58 in FIG. 2) due to the presence of the virtual robot between the real machine and the conveyer. To ensure the proper working order of the system, the part presence token 164 is used and depending on the condition, the part presence token 164 will send proper part presence signals from the virtual world or the real sensors to the PLC. This practice of part sensing signal mapping will be discussed further below.

The part presence token 164 works according to the rules discussed above. However, in other situations, the actual part 152 may be worked on by the machine in the real cell 154, where the virtual part is inactive. It is assumed that sensors are provided between the real cells 154 and the virtual cells 158 so that the process knows when the part 152 is moved from the real world to the virtual world and from the virtual world to the real world. If there is no sensor available at the interface of the real cells 154 and the virtual cells 158, a sensor needs to be added to the integrated virtual and real manufacturing automation system.

Figure 8:
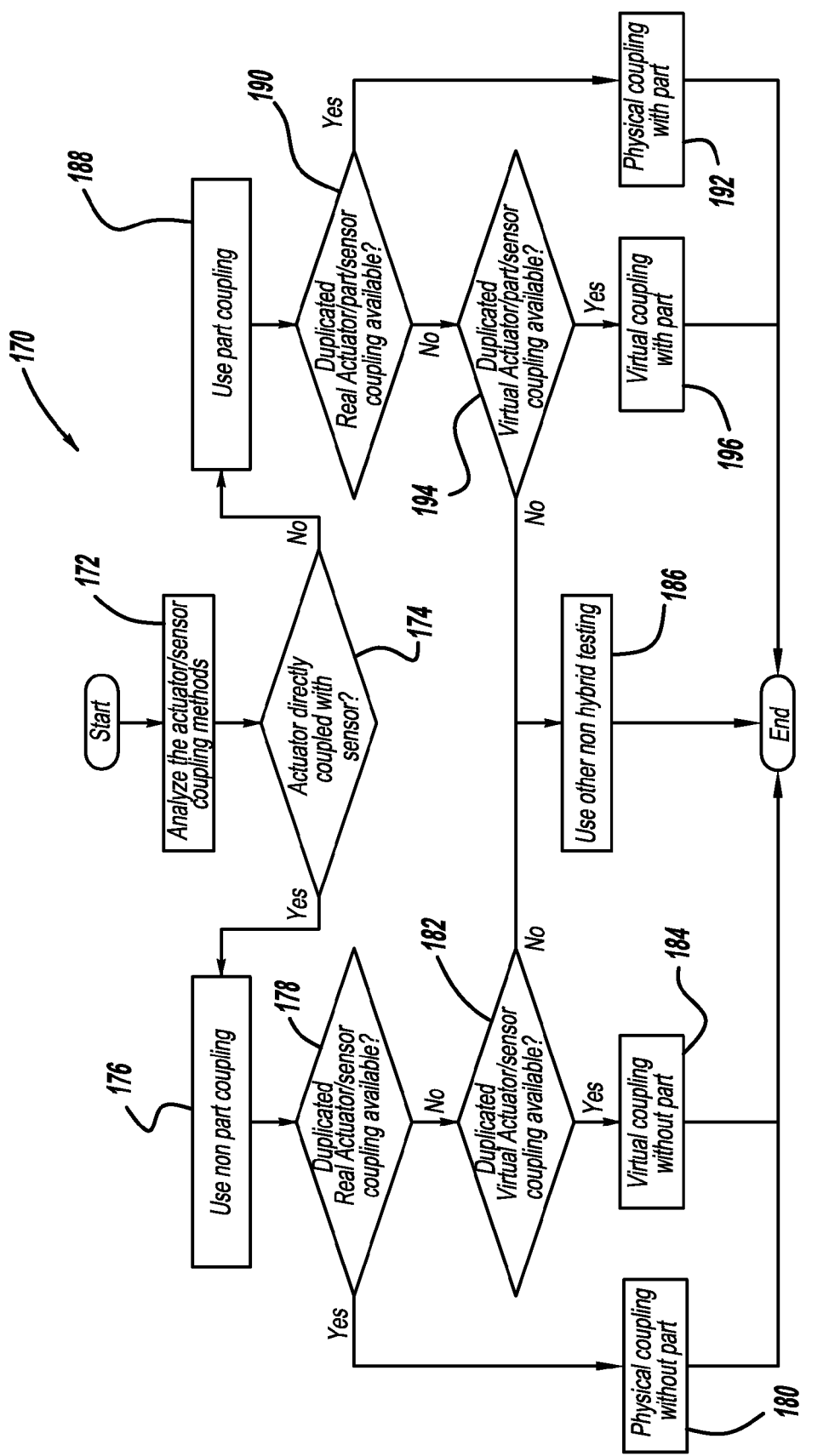
FIG. 8 is a flow chart diagram showing a process for determining virtual/physical coupling with and without a part.

FIG. 8 is a flow chart diagram 170 of a decision tree for selecting a proper sequence (serial) coupling method for handling the actuator action to the sensor sensing. In general, there are no sensors and actuators duplicated in the integrated virtual or real manufacturing automation system, except for the boundary region. The actuation of the actuator will eventually lead to the state change of the following sensor, directly or indirectly, and through a part or not through a part. For example, a motor encoder sensor will immediately sense the motion of the motor. However, the up and down position sensors of a lift only change their state when the lift arrives at and leaves from a corresponding position, not when the lift is in motion between the two corresponding positions. Another example of this scenario is that sensors on the two downstream branches of a sorting machine alter their state when the part travels through its corresponding branch as a consequence of the upstream actuator or sorter. Therefore, there is a need to consider the sequence coupling of the actuator action to the sensor sensing. Some of the actuator actions to the sensor sensing involve the part, while others do not. To address those issues, it is necessary that some sensors and actuators be duplicated in the virtual system so that the integrated virtual real system will function as a real system does.

The first step in the process is to analyze the interactions between sensor and actuator coupling methods at box 172. From this analysis, the process determines whether the actuator and sensor are directly coupled at decision diamond 174, such as a lifter with a position sensor, or coupled indirectly, such as a pusher with a photo-eye sensor. If the coupling is direct at the decision diamond 174, then the process uses non-part coupling at box 176. The process then determines whether duplicated real actuator and sensor coupling is available at decision diamond 178. If duplicated real actuator and sensor coupling is available at the decision diamond 178, then the process uses physical coupling without a part at box 180. However, if duplicated real actuator and sensor coupling is not available at the decision diamond 178, then the process determines whether duplicated virtual actuator and sensor coupling is available at decision diamond 182. If duplicated virtual actuator and sensor coupling is available at the decision diamond 182, then the process provides virtual coupling without a part at box 184. If duplicated virtual actuator and senor coupling is not available at the decision diamond 182, then the process uses other non-hybrid testing techniques at box 186.

The same process is used if the actuator does not directly interact with the sensor at the decision diamond 174, where a part is involved in the coupling at box 188. The process determines whether duplicated real actuator, part and sensor coupling is available at decision diamond 190, and if so, provides physical coupling with the part at box 192. If duplicated real actuator, part and sensor coupling is not available at the decision diamond 190, then the process determines whether duplicated virtual actuator, part and sensor coupling is available at decision diamond 194, and if so, provides virtual coupling with the part at box 196. Otherwise, the process goes to the box 186 to provide other non-hybrid testing.

Figure 9:
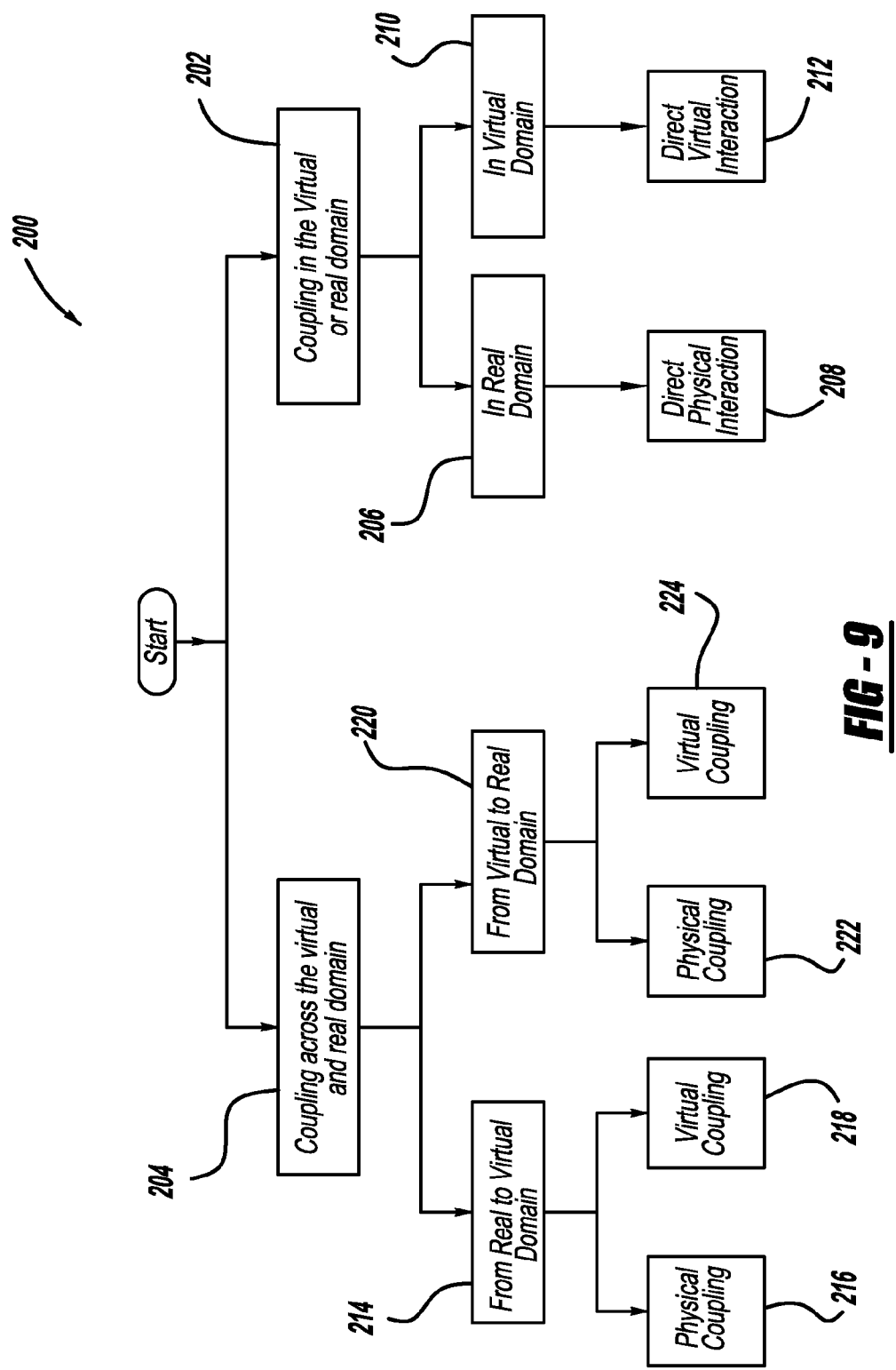
FIG. 9 is a flow chart diagram showing a process for selecting sensor/actuator coupling without a part across an integrated virtual and real automation system.

FIG. 9 is a flow chart diagram 200 showing a decision tree process for selecting the proper sensor/actuator coupling when there is no part involved in an actuator action and a sensor sensing sequence. In general, this problem is divided into two groups, namely, coupling purely inside the real or virtual domains and coupling across the boundary of the real and virtual domains at boxes 202 and 204, respectfully. For coupling inside the real or virtual domain at the box 202, there is no special attention required as the actuator action to the sensor sensing sequence coupling happens naturally as the process flow. Particularly, in the real domain at box 206, there is direct physical interaction between the sensor and actuator at box 208. In the virtual domain at box 210, there is direct virtual interaction between the actuator and sensor at box 212.

For coupling across the boundary between the real and virtual domains at the box 204 there are four different scenarios. For coupling from the real domain to the virtual domain at box 214, physical coupling from the real domain to the virtual domain is provided at box 216. This process can add a mapped physical sensor to couple with physical actuator and overwrite corresponding virtual sensor to drive the emulation, as will be discussed below with reference to FIG. 11. Also for coupling from the real domain to the virtual domain, virtual coupling is provided at box 218. This process can add a mapped virtual actuator that synchronizes with a real actuator to couple with a virtual sensor and drive the emulation, as will be discussed below with reference to FIG. 12. Coupling from the virtual domain to the real domain is provided at box 220, which is broken down to physical coupling at box 222 and virtual coupling at box 224. For the physical coupling from the virtual domain to the real domain, the process can add a mapped real actuator that synchronizes with a virtual actuator to couple a real sensor to trigger a real domain execution, as will be discussed below with reference to FIG. 13. For the virtual coupling from the virtual domain to the real domain, the process can add a mapped virtual sensor coupling with a virtual actuator to overwrite a corresponding real sensor to trigger a real side execution, as will be discussed below with reference to FIG. 14.

Figure 10:
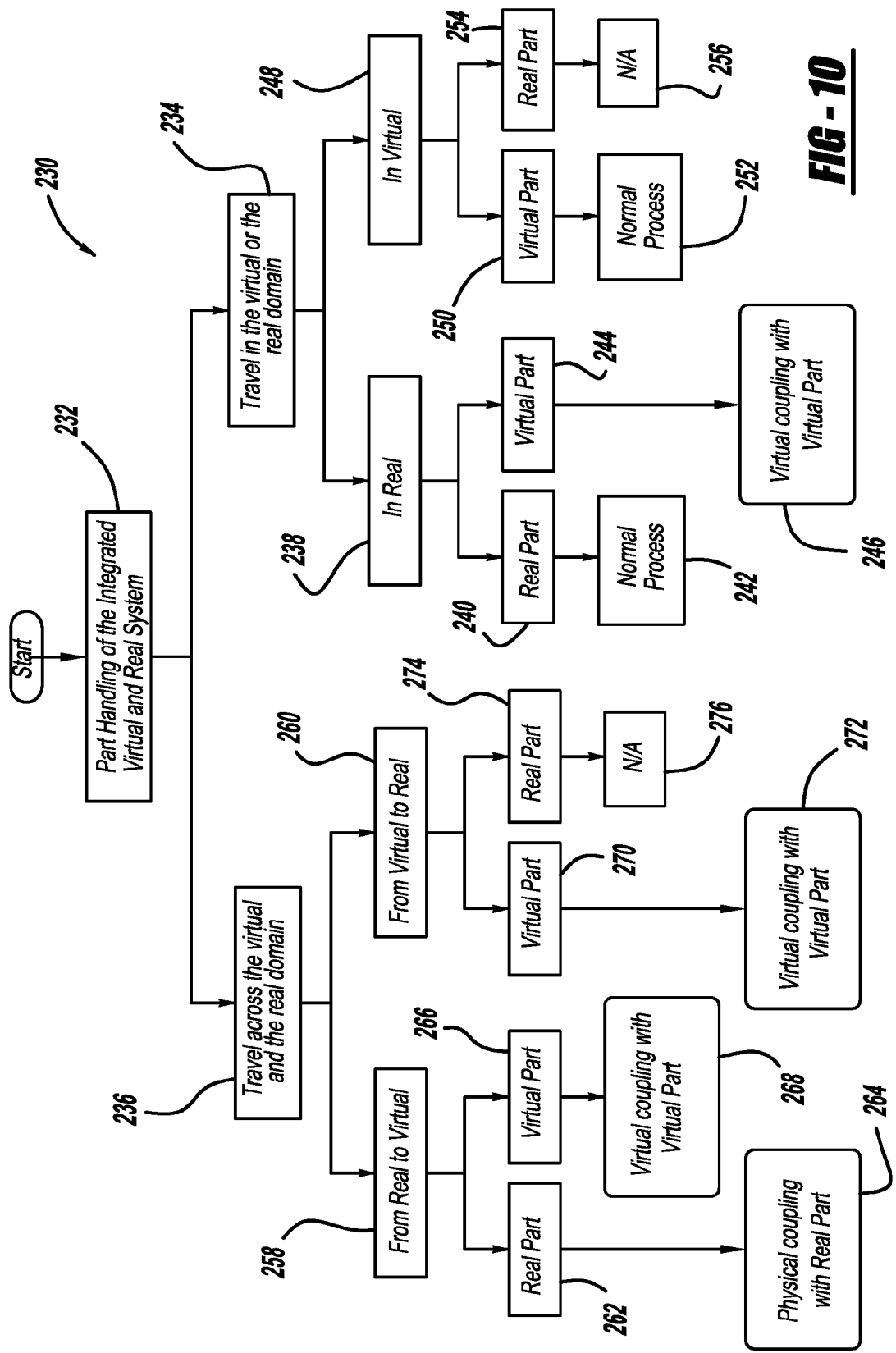
FIG. 10 is a flow chart diagram showing a process for part handling of an integrated virtual and real automation system.

FIG. 10 is a flow chart diagram 230 showing a decision tree process for selecting a proper coupling method for handling a part transferred across the virtual and real domains in an integrated system as provided at box 232. This part handling problem can be provided into two groups, namely, part handling purely inside the real or virtual domain at box 234 and a part traveling across the boundary between the real and virtual domains at box 236. For part handling inside either the real or virtual domain at the box 234, the decision can be further divided based on the absence or presence of a real part. When the part is present in the real domain at box 238, and there is a real part at box 240, then normal processes are used at box 242. If a virtual part is being used in the real domain at box 244, the process duplicates the real actuator and real sensor in the virtual domain using information obtained from the virtual actuator and virtual part interaction, and uses the duplicate sensor signal to override the signal from non-functional real sensor due to the absence of a real part at box 246. If the part is in the virtual domain at box 248 and a virtual part is being used at box 250, then normal processes are used at box 252. The situation where a real part travels in the virtual domain does not exist so that it is not applicable at box 256.

A part traveling across the boundary between the virtual and real domains can either travel from the real domain to the virtual domain at box 258 or travel from the virtual domain to the real domain at box 260. For a real part traveling from the real domain to the virtual domain at box 262, physical coupling is used at box 264. For a virtual part traveling from the real domain to the virtual domain at box 266, a virtual coupling method is used with a virtual part at box 268. For a virtual part traveling from the virtual domain to the real domain at box 270, a virtual coupling method is used with a virtual part at box 272. The situation where a real part travels from the virtual domain to the real domain at box 274 does not exist so that it is not applicable at box 276.

Figure 11:
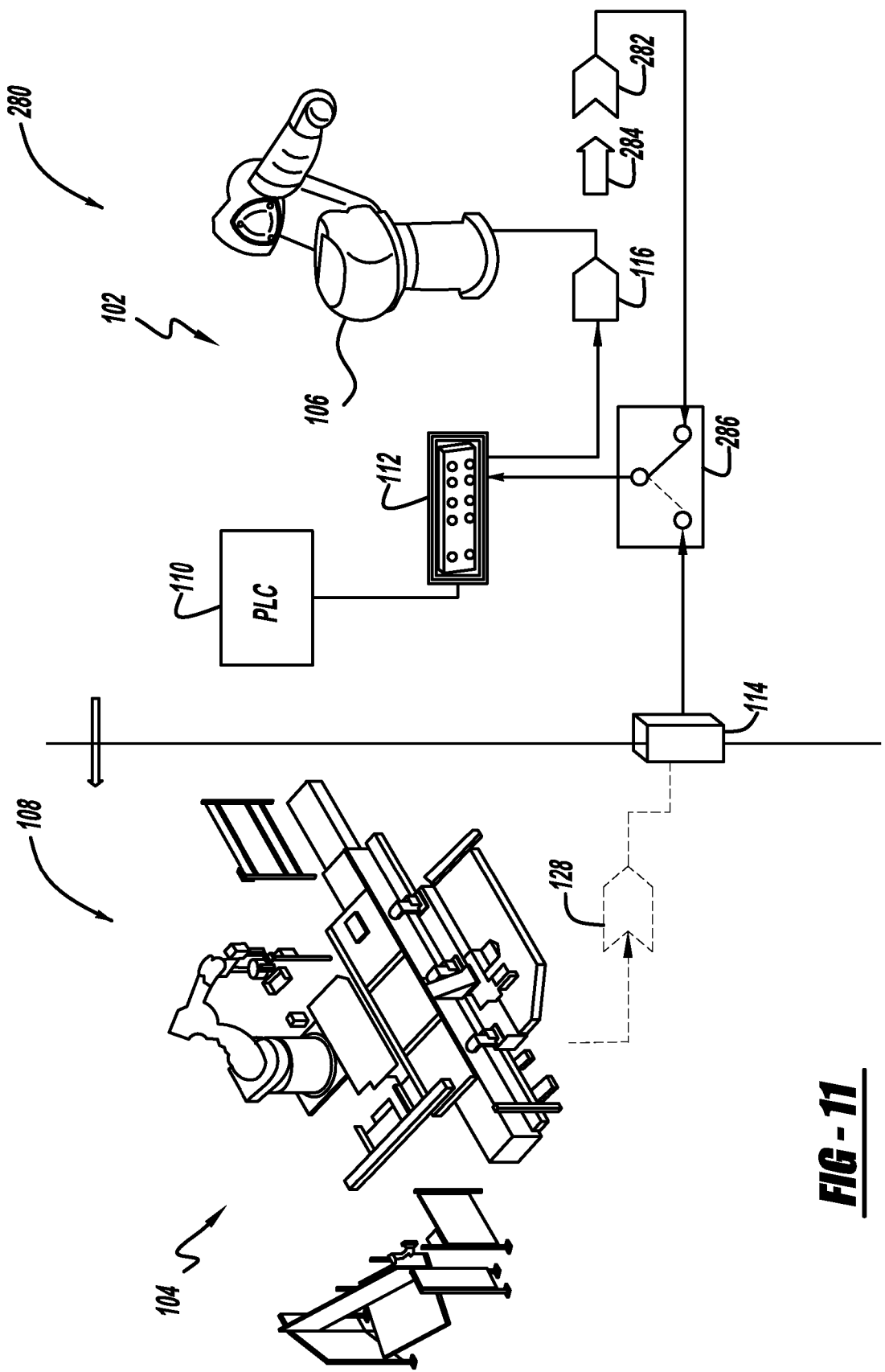
FIG. 11 is a plan view of an integrated real and virtual manufacturing automation system showing physically coupled sensors and actuators for a part flow from the real domain to the virtual domain.

FIG. 11 is a plan view of an integrated real and virtual manufacturing automation system 280 showing a physically coupled sensor/actuator for a part flow from the real domain 102 to the virtual domain 104, particularly, a part flow from the robot 106 to the virtual machine 108, without a part, where like elements to the system 100 are identified by the same reference numeral. The robot 106 uses the real actuator 116 and the virtual machine 108 uses the virtual sensor 128. This physical coupling process starts with providing a duplicated real sensor 282 that is coupled in serial to the real actuator 116 through a coupler interface 284. The output signal from the I/O module 112 to the real actuator 116 would normally be sensed by the real sensor 118 and sent to the virtual sensor 128 through the interface card 114. In this embodiment, the signal from the duplicate real sensor 282 is instead sent to a switch 286 that sends the sensor signal to the I/O module 112 so that the virtual sensor 128 is by-passed and the signal from the virtual sensor 128 is overridden by the signal from the duplicated sensor 282.

Figure 12:
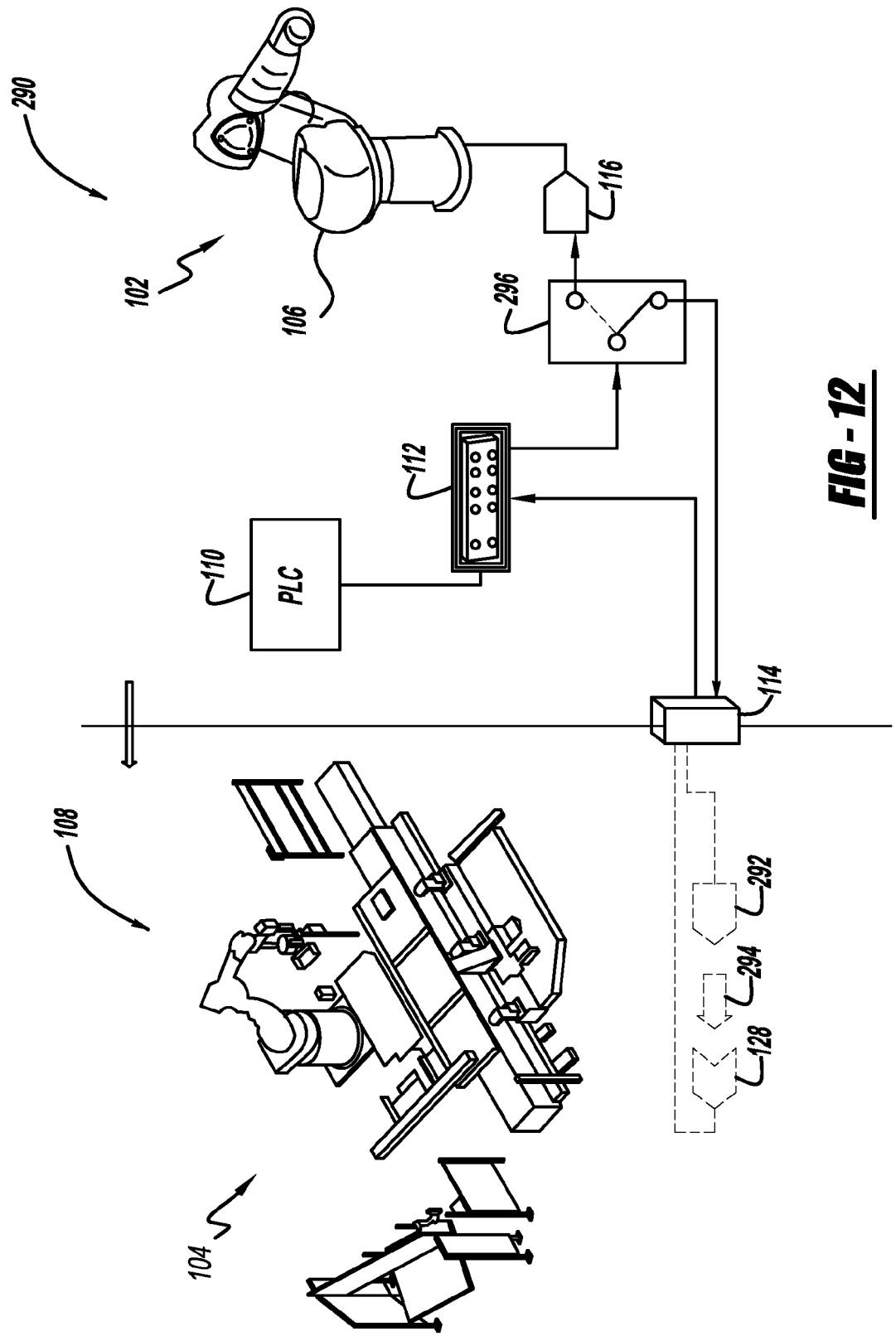
FIG. 12 is a plan view of an integrated real and virtual manufacturing automation system showing virtually coupled sensors and actuators for a part flow from the real domain to the virtual domain.

FIG. 12 is a plan view of an integrated real and virtual manufacturing automated system 290 showing a virtually coupled sensor and actuator for a part flow from the real domain 102 to the virtual domain 104, particularly, a part flow from the robot 106 to the virtual machine 108, without a physical part, where like elements to those in the system 100 are identified by the same reference numeral. The robot 106 uses the real actuator 116 and the virtual machine 108 uses the virtual sensor 128. This virtual coupling process starts with providing a duplicated virtual actuator 292 that is coupled to the virtual sensor 130 by a coupling interface 294. The output signal from the I/O module 112 that would normally be intended for the real actuator 116 is switched by a switch 296 to the interface card 114 to be received by the duplicated virtual actuator 292. The virtual actuator 292 subsequently provides the state change for the virtual sensor 128.

Figure 13:
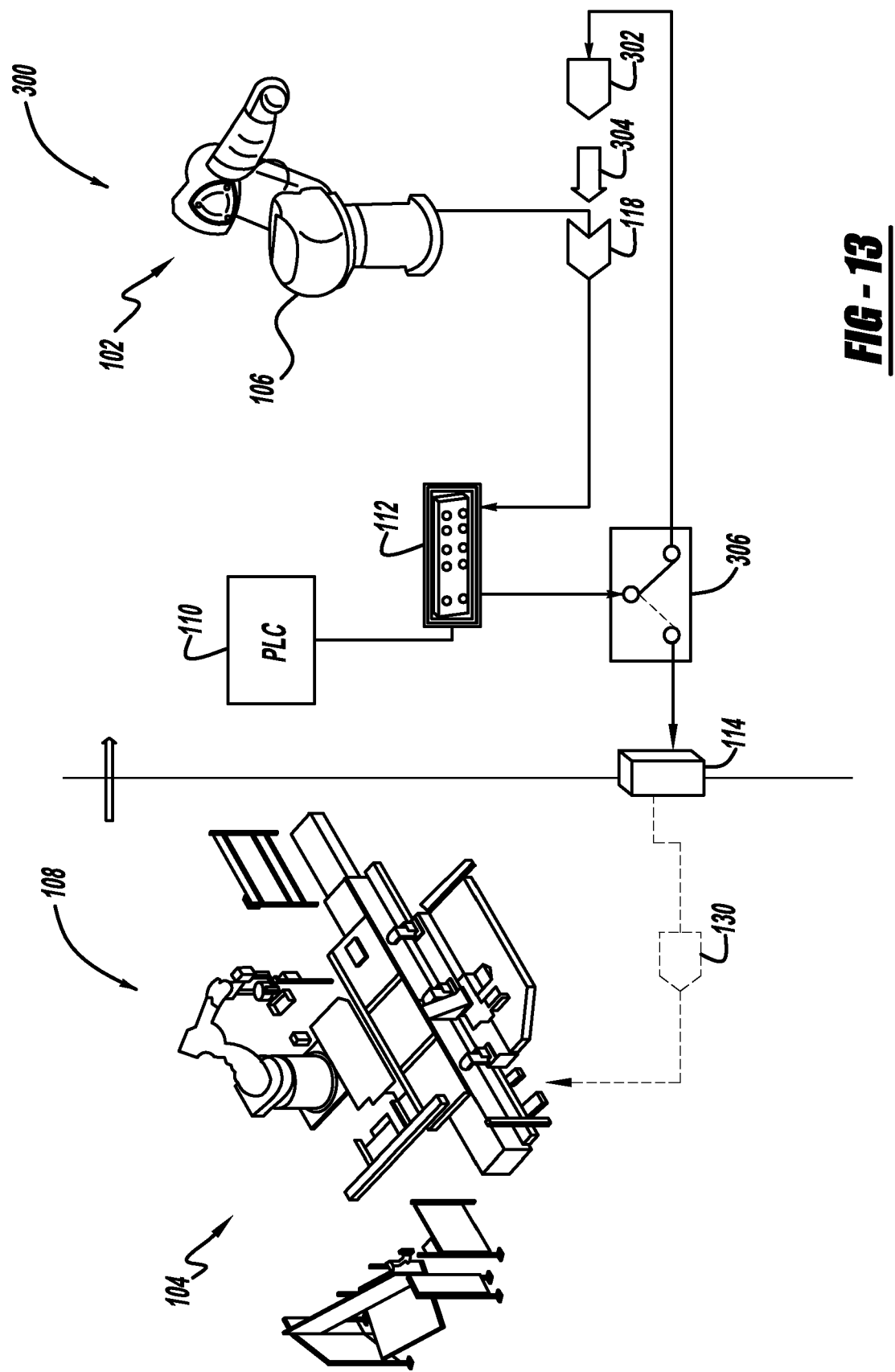
FIG. 13 is a plan view of an integrated real and virtual manufacturing automation system showing physically coupled sensors and actuators for a part flow from the virtual domain to the real domain.

FIG. 13 is a plan view of an integrated real and virtual manufacturing automation system 300 showing physically coupled sensors and actuators with a part flow from the virtual domain 104 to the real domain 102 without a physical part, where like elements to the system 100 are identified by the same reference numeral. The robot 106 uses the real sensor 118 and the virtual machine 108 uses the virtual actuator 130. The physical coupling process starts by adding a duplicated real actuator 302 that is coupled to the real sensor 118 through a coupling interface 304. The output from the I/O module 112 that would normally be sent to the virtual actuator 130 is by-passed by a switch 306 so that the output from the I/O module 112 is sent to the duplicated real actuator 302.

Figure 14:
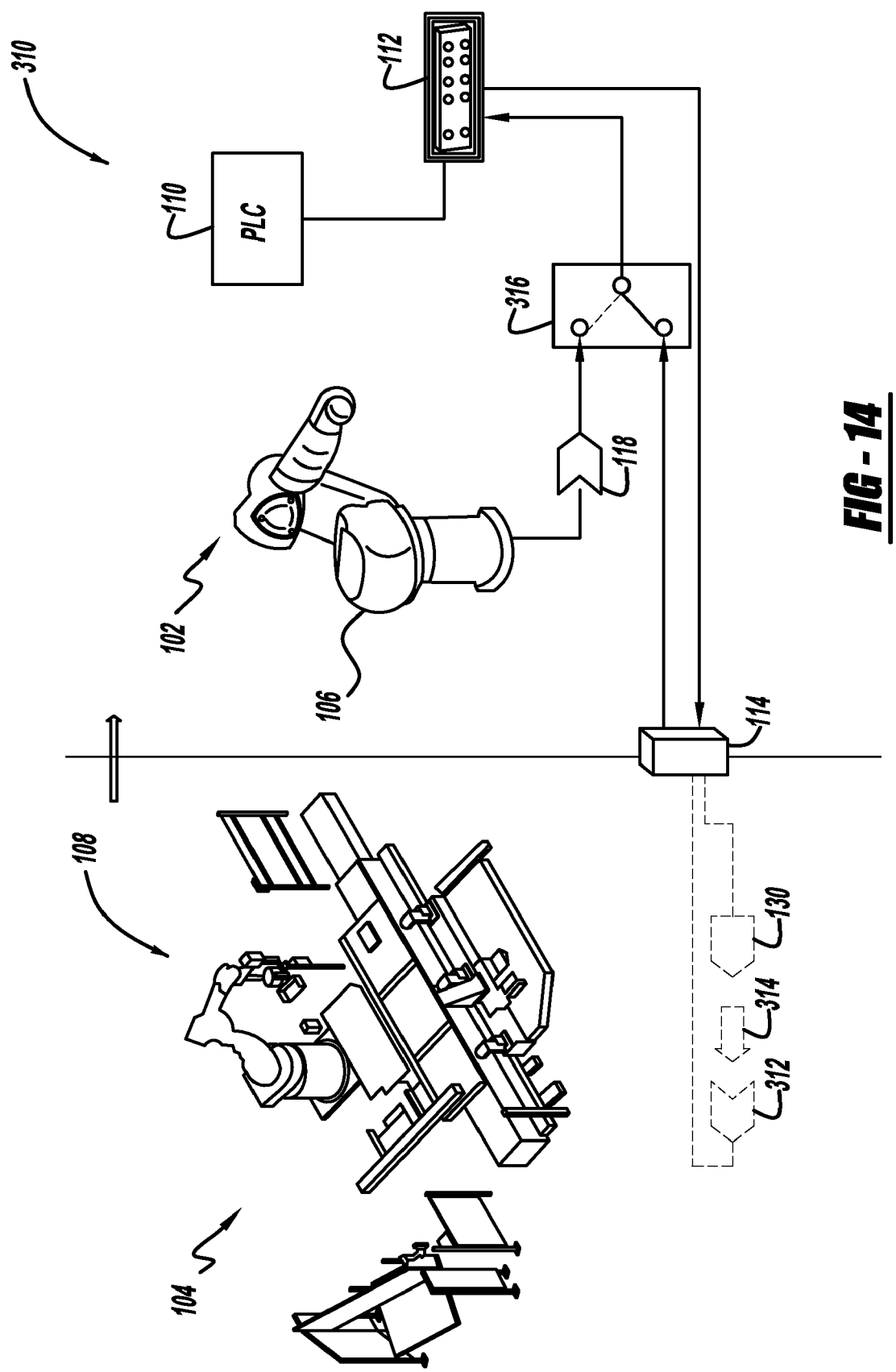
FIG. 14 is a plan view of an integrated real and virtual manufacturing automation system showing virtually coupled sensors and actuators with a virtual part flow from the virtual domain to the real domain.

FIG. 14 is a plan view of an integrated real and virtual manufacturing automation system 310 showing virtual coupling between a sensor and an actuator for a virtual part flow from the virtual domain 104 to the real domain 102, where like elements to the system 100 are identified by the same reference numeral. The robot 106 uses the real sensor 118 and the virtual machine 108 uses the virtual actuator 130. This virtual coupling process employs a duplicated virtual sensor 312 that is coupled to the virtual actuator 130 through a virtual coupling interface 314. Signals from the virtual actuator 130 are sensed by the duplicated sensor 312, and the signals from the duplicate sensor 312 are sent as an input to the I/O module 112 through a switch 316 that by-passes the real sensor 118.

Figure 15:
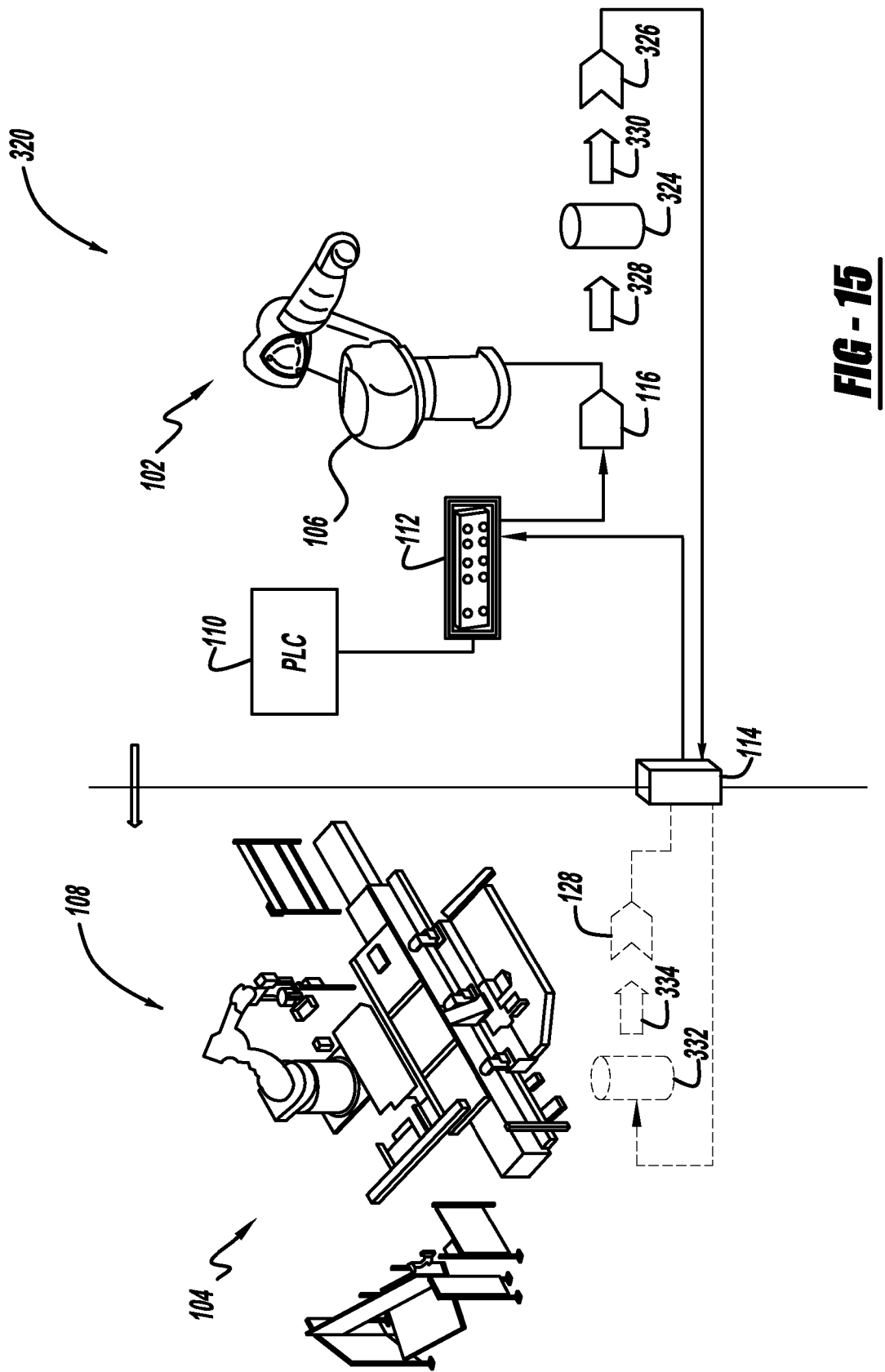
FIG. 15 is a plan view of an integrated real and virtual manufacturing automation system showing physically coupled sensors and actuators with a real part flow from the real domain to the virtual domain.

FIG. 15 is a plan view of an integrated real and virtual manufacturing automation system 320 showing a physical coupling between a sensor and an actuator for a part flow from the real domain 102 to the virtual domain 104 using a real part, where like elements to the system 100 are identified by the same reference numeral. The robot 106 uses the real actuator 116 and the virtual machine 108 uses the virtual sensor 128. The real actuator 116 interacts with a real part 324. The physical coupling process starts with providing a duplicated real sensor 326 that is coupled to the real actuator 116 indirectly through the part 324 and coupling interfaces 328 and 330. Signals from the duplicated sensor 326 are sent to the interface card 114 that triggers the birth of a virtual part 332. The virtual part 332 is coupled to the virtual sensor 128 through a coupling interface 334.

Figure 16:
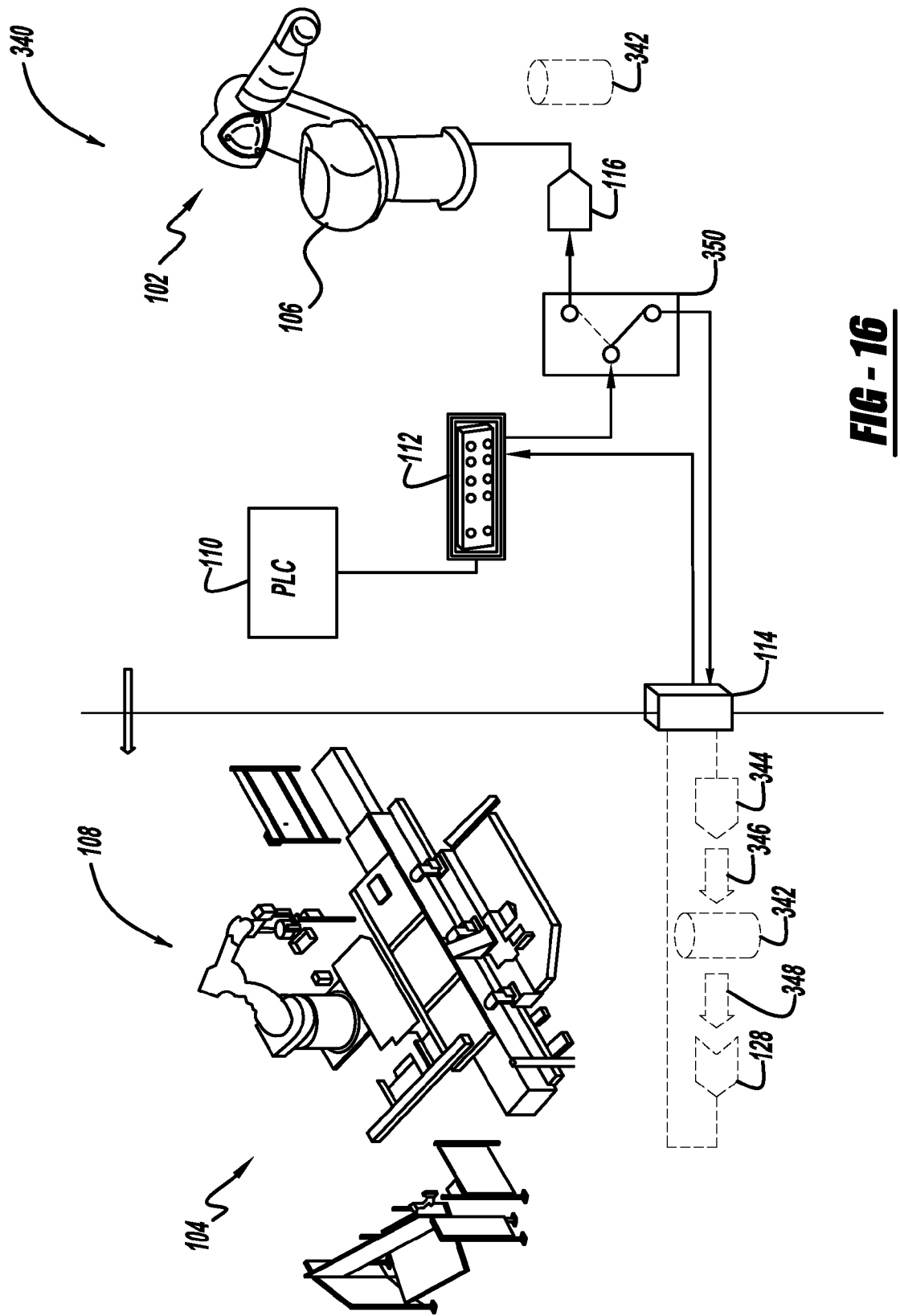
FIG. 16 is a plan view of an integrated real and virtual manufacturing automation system showing virtually coupled sensors and actuators with a virtual part flow from the real domain to the virtual domain.

FIG. 16 is a plan view of an integrated real and virtual manufacturing automation system 340 showing virtual coupling between a sensor and an actuator for a part flow from the real domain 102 to the virtual domain 104 using a virtual part, where like elements to the system 100 are identified by the same reference numeral. The robot 106 uses the real actuator 116 and the virtual machine 108 uses the virtual sensor 128. The real actuator 116 interacts with a virtual part 342. This embodiment for the virtual coupling process provides a duplicated virtual actuator 344 that is coupled to the virtual sensor 128 indirectly through the virtual part 342 and coupling interfaces 346 and 348. Output signals from the I/O module 112 that were intended for the real actuator 116 and by-passed by a switch 350 so that the signals are sent to the interface card 114 to drive the virtual actuator 344 and trigger the virtual machine 108 to perform some action.

Figure 17:
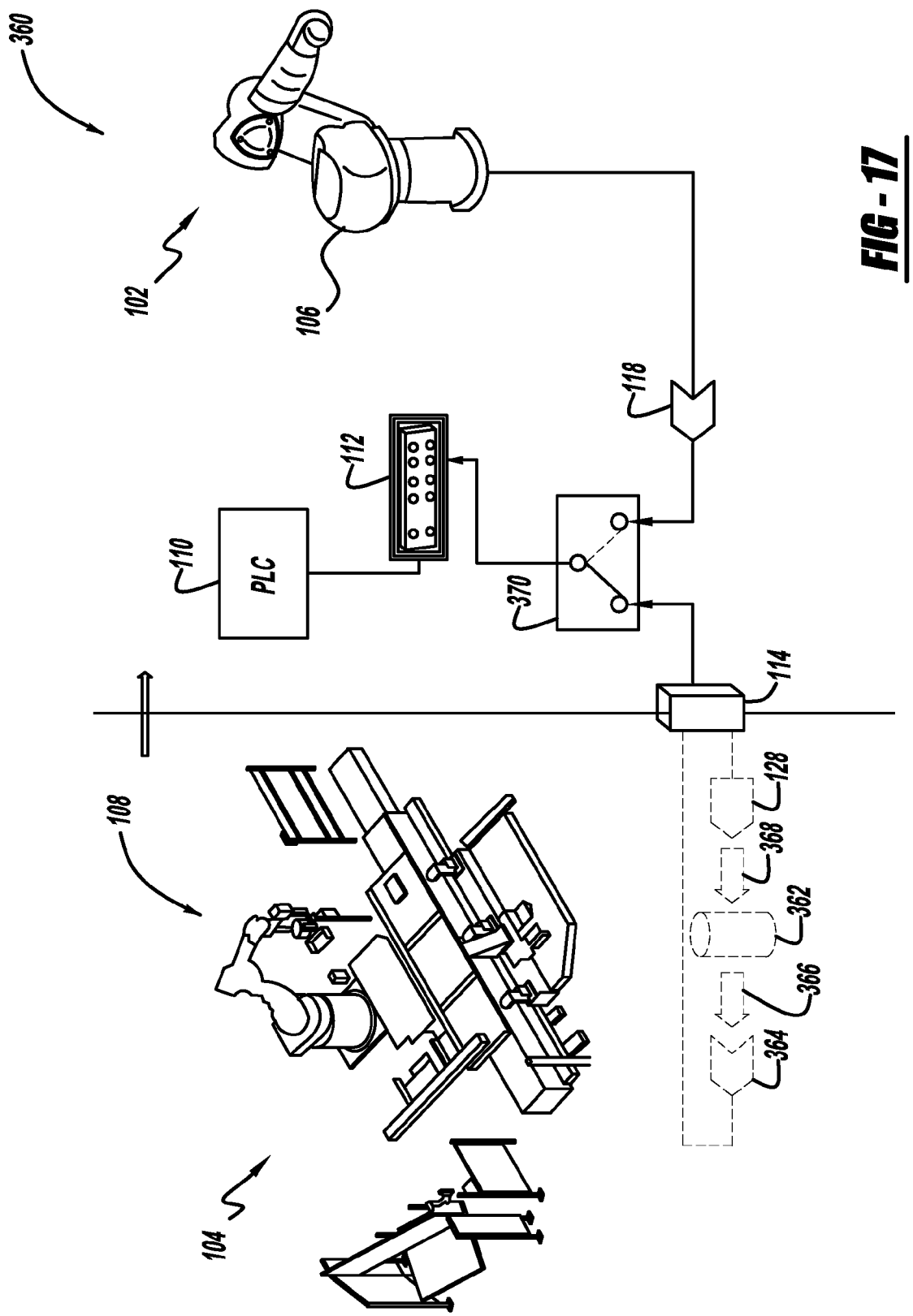
FIG. 17 is a plan view of an integrated real and virtual manufacturing automation system showing virtually coupled sensors and actuators with a virtual part flow from the virtual domain to the real domain.

FIG. 17 is a plan view of an integrated real and virtual manufacturing automation system 360 showing virtual coupling between a sensor and actuator for a virtual part flow from the virtual domain 104 to the real domain 102, where like elements to the system 100 are identified by the same reference numeral. The robot 106 uses the real sensor 118 and the virtual machine 108 uses the virtual actuator 130. The virtual actuator 130 interacts with a virtual part 362. The virtual coupling provides a duplicated virtual sensor 364 that is coupled to the virtual actuator 130 indirectly through the virtual part 362 and coupling interfaces 366 and 368. Signals from the virtual sensor 364 and sent to the interface card 114 as an output, which is used to replace the signal from the real sensor 118 by a switch 370.

Figure 18:
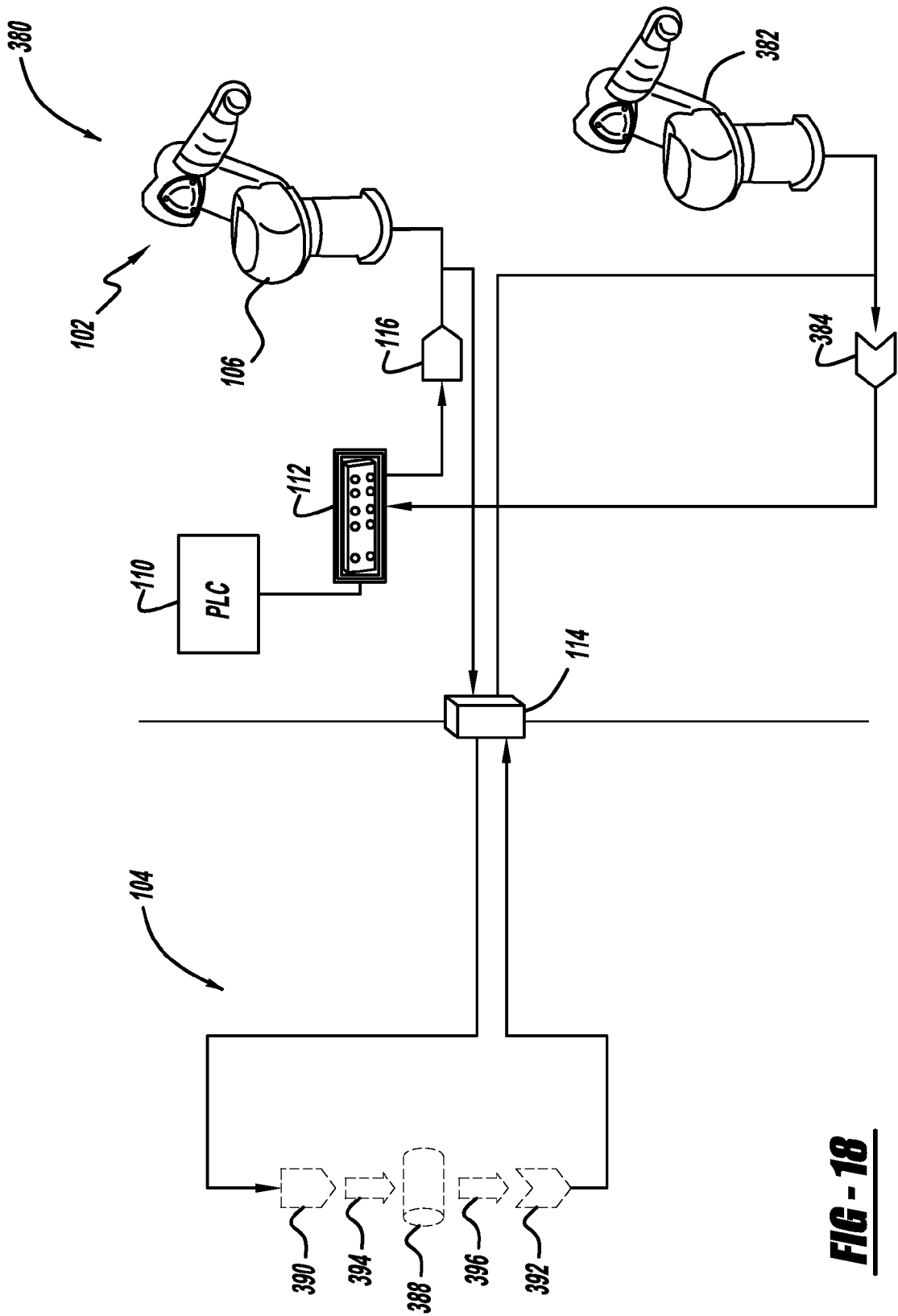
FIG. 18 is a plan view of an integrated real and virtual manufacturing automation system showing a virtual part flow in the real domain.

FIG. 18 is a plan view of an integrated real and virtual manufacturing automation system 380 showing sensors and actuators in the real domain 102 interacting with a virtual part, where like elements to the system 100 are identified by the same reference numeral. A second real world machine, such as a robot 382, is provided in the real domain 102. A real sensor 384 receives signals from the robot 382 and the real actuator 116 controls the actuation of the robot 106. The coupling technique is applicable to the situation where the real part does not exist in the real world. To facilitate the proper sensing of the virtual part by the robot 382, a virtual part 388 in the virtual domain 104 is provided. A virtual actuator 390 is provided to duplicate the real actuator 116 and a virtual sensor 392 is provided to duplicate the real sensor 384. The virtual actuator 390 is synchronized with the real actuator 116 through the interface card 114 and the virtual sensor 392 overwrites the real sensor 384 through the interface card 114. The coupling is achieved indirectly between the virtual actuator 390 and the virtual sensor 392 through the virtual part 388 and coupling interfaces 394 and 396 to provide the virtual part between the robots 106 and 382.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for integrating a real and virtual manufacturing automation system where a part appears to a programmable logic controller to flow between a virtual world domain of the system and a real world domain of the system, said method comprising:
providing a first real world machine in the real world domain of the system;
providing a first primary real world sensor in the real world domain of the system for sensing a position of the first real world machine;
providing a primary real world actuator in the real world domain of the system for actuating the first real world machine;
providing a virtual world machine in the virtual world domain of the system;
providing a primary virtual world sensor in the virtual world domain of the system for sensing the position of the virtual world machine;
providing a primary virtual world actuator in the virtual world domain of the system for actuating the virtual world machine;
providing an interface device for transferring signals between the virtual world domain of the system and the real world domain of the system;
providing a programmable logic controller that controls the actuators ; and
providing an input/output (I/O) device that processes signals sent to the programmable logic controller from the sensors and signals sent from the programmable logic controller to the actuators, said programmable logic controller controlling the operation of the actuators, so as to provide virtual coupling between sensors and actuators in the virtual world domain of the system and the real world domain of the system for both a real and a virtual part.

2. The method according to claim 1 further comprising providing a voltage translation device for converting voltage signals transmitted between the input/output device and the interface device so as to provide a direct electrical connection between the real world domain of the system and the virtual world domain of the system.

3. The method according to claim 1 wherein the programmable logic controller controls a part flow from the first real world machine to the virtual world machine, said method further comprising providing a duplicated virtual actuator that is coupled to the primary virtual world sensor by a virtual coupling interface and a switching device, wherein the switching device switches an output signal from the input/output device intended for the primary real world actuator to the duplicated virtual actuator through the interface device.

4. The method according to claim 1 wherein the programmable logic controller controls a part flow from the virtual world machine to the first real world machine, said method further comprising providing a duplicated virtual sensor coupled to the primary virtual world actuator by a virtual coupling interface and a switching device, wherein the switching device switches an input signal to the input/output device from the first primary real world sensor to the duplicated virtual sensor and the interface device through the interface device.

5. The method according to claim 1 wherein the programmable logic controller controls a part flow from the primary real world machine to the virtual world machine using the virtual part, said method further comprising providing a duplicated virtual actuator coupled to the primary virtual world sensor by a virtual coupling interface and the virtual part and a switching device, wherein an output signal from the input/output device intended for the primary real world actuator is directed to the duplicated virtual actuator through the interface device to be received by the primary virtual world sensor.

6. The method according to claim 1 wherein the programmable logic controller controls a part flow from the virtual world machine to the real world machine using the virtual part, said method further comprising providing a duplicated virtual sensor coupled to the primary virtual world actuator through a virtual coupling interface and the virtual part and a switching device, wherein the switching device switches an input signal from the input/output device that would generally be from the primary real world sensor to the duplicated virtual sensor through the interface device.

7. The method according to claim 1 wherein the programmable logic controller controls a part flow only in the real world domain of the system, said method further comprising a second real world machine and a second primary real world sensor for sensing the position of the second real world machine, where the part flow is from the first real world machine to the second real world machine, said method further comprising providing a duplicated virtual actuator coupled to the primary virtual world sensor by a virtual coupling interface and the virtual part where an output of the primary virtual world sensor is provided to the second primary real world sensor through the interface device.

8. The method according to claim 1 further comprising providing a first complimentary pair of a physical sensor and an actuator and a second complimentary pair of a physical sensor and an actuator in the real world domain of the system, wherein the sensor in the first complimentary pair senses signals from the actuator in the first complimentary pair that is driven by the I/O device to by-pass the primary virtual world sensor through the interface device, and wherein the actuator in the second complimentary pair receives signals that are supposed to be sent to the primary virtual world actuator through the interface device from the I/O device and cause the sensor in the second complimentary pair to generate signals.

9. The method according to claim 1 wherein the real and virtual manufacturing automation system is an automotive manufacturing automation system.

10. An integrated real and virtual manufacturing automation system including a virtual world domain and a real world domain, said system comprising:
   a first real world machine in the real world domain of the system;
   a first primary real world sensor in the real world domain of the system for sensing a position of the first real world machine;
   a primary real world actuator in the real world domain of the system for actuating the first real world machine;
   a virtual world machine in the virtual world domain of the system;
   a primary virtual world sensor in the virtual world domain of the system for sensing the position of the virtual world machine;
   a primary virtual world actuator in the virtual world part domain of the system for actuating the virtual world machine;
   an interface device for transferring signals between the virtual world domain of the system and the real world domain of the system;
   a programmable logic controller configured to control the actuators; and
   an input/output (I/O) device that processes signals sent to the programmable logic controller from the sensors and signals sent from the programmable logic controller to the actuators, said programmable logic controller configured to control the operation of the actuators, so as to provide virtual coupling between sensors and actuators in the virtual world domain of the system and the real world domain of the system for both a real part and a virtual part.

11. The system according to claim 10 further comprising a voltage translation device for converting voltage signals transmitted between the input/output device and the interface device so as to provide a direct electrical connection between the real world domain of the system and the virtual world domain of the system.

12. The system according to claim 10 wherein the programmable logic controller controls a part flow from the first real world machine to the virtual world machine, said system further comprising providing a duplicated virtual actuator that is coupled to the primary virtual world sensor by a virtual coupling interface and a switching device, wherein the switching device switches an output signal from the input/output device intended for the primary real world actuator to the duplicated virtual actuator through the interface device.

13. The system according to claim 10 wherein the programmable logic controller controls a part flow from the virtual world machine to the first real world machine, said system further comprising providing a duplicated virtual sensor coupled to the primary virtual world actuator by a virtual coupling interface and a switching device, wherein the switching device switches an input signal to the input/output device from the first primary real world sensor to the duplicated virtual sensor and the interface device through the interface device.

14. The system according to claim 10 wherein the programmable logic controller controls a part flow from the primary real world machine to the virtual world machine using the virtual part, said system further comprising providing a duplicated virtual actuator coupled to the primary virtual world sensor by a virtual coupling interface and the virtual part and a switching device, wherein an output signal from the input/output device intended for the primary real world actuator is directed to the duplicated virtual actuator through the interface device to be received by the primary virtual world sensor.

15. The system according to claim 10 wherein the programmable logic controller controls a part flow from the virtual world machine to the real world machine using a virtual part, said system further comprising providing a duplicated virtual world sensor coupled to the primary virtual world actuator through a virtual coupling interface and the virtual part and a switching device, wherein the switching device switches an input signal from the input/output device that would generally be from the primary real world sensor to the duplicated virtual sensor through the interface device.

16. The system according to claim 10 wherein the programmable logic controller controls a part flow only in the real world domain of the system, said system further comprising a second real world machine and a second primary real world sensor for sensing the position of the second real world machine, where the part flow is from the first real world machine to the second real world machine, said system further comprising providing a duplicated virtual actuator coupled to the primary virtual world sensor by a virtual coupling interface and the virtual part where an output of the primary virtual world sensor is provided to the second primary real world sensor through the interface device.

17. The system according to claim 10 further comprising a first complimentary pair of a physical sensor and an actuator and a second complimentary pair of a physical sensor and an actuator in the real world domain of the system, wherein the sensor in the first complimentary pair senses signals from the actuator in the first complimentary pair that is driven by the I/O device to by-pass the primary virtual world sensor through the interface device, and wherein the actuator in the second complimentary pair receives signals that are supposed to be sent to the primary virtual world actuator through the interface device from the I/O device and cause the sensor in the second complimentary pair to generate signals.

18. The system according to claim 10 wherein the real and virtual manufacturing automation system is an automotive manufacturing automation system.

19. An integrated real and virtual manufacturing automation system including a virtual world domain and a real world domain, said system comprising:
   a first real world machine in the real world domain of the system;
   a first primary real world sensor in the real world domain of the system for sensing a position of the first real world machine;
   a primary real world virtual actuator in the real world domain of the system for actuating the first real world machine;
   a virtual world machine in the virtual world domain of the system;
   a primary virtual world sensor in the virtual world domain of the system for sensing the position of the virtual world machine;
   a primary virtual world actuator in the virtual world domain of the system for actuating the virtual world machine;

an interface device for transferring signals between the virtual world domain of the system and the real world domain of the system;

a programmable logic controller configured to control the actuators;

an input/output (I/O) device that processes signals sent to the programmable logic controller from the sensors and signals sent from the programmable logic controller to the actuators, said programmable logic controller configured to control the operation of the actuators, so as to provide virtual coupling between sensors and actuators in the virtual world domain of the system and the real world domain of the system for both a real part and a virtual part;

a voltage translation device for converting voltage signals transmitted between the input/output device and the interface device so as to provide a direct electrical connection between the real world domain of the system and the virtual world domain of the system; and duplicated sensors, duplicated actuators and switching devices that by-pass signals depending on the direction of a part flow between the real world domain of the system and the virtual world domain of the system and whether the system is working on the real part or the virtual part.

20. The system according to claim 19 further comprising a first complimentary pair of a physical sensor and an actuator and a second complimentary pair of a physical sensor and an actuator in the real world domain of the system, wherein the sensor in the first complimentary pair senses signals from the actuator in the first complimentary pair that is driven by the I/O device to by-pass the primary virtual world sensor through the interface device, and wherein the actuator in the second complimentary pair receives signals that are supposed to be sent to the primary virtual world actuator through the interface device from the I/O device and cause the sensor in the second complimentary pair to generate signals.

* * * * *